US008425030B2

(12) United States Patent
Irita

(10) Patent No.: US 8,425,030 B2
(45) Date of Patent: Apr. 23, 2013

(54) IMAGE FORMING METHOD

(75) Inventor: Kiyoshi Irita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 272 days.

(21) Appl. No.: 13/036,027

(22) Filed: Feb. 28, 2011

(65) Prior Publication Data

US 2011/0211012 A1 Sep. 1, 2011

(30) Foreign Application Priority Data

Mar. 1, 2010 (JP) ................................ 2010-044559

(51) Int. Cl.
*C09D 11/00* (2006.01)

(52) U.S. Cl.
USPC ........................................ 347/100; 106/31.13

(58) Field of Classification Search .................. 347/100; 106/31.13
See application file for complete search history.

(56) References Cited

U.S. PATENT DOCUMENTS 7,628,481 B2 * 12/2009 Kadomatsu et al. .......... 347/102
2004/0157959 A1 * 8/2004 Turgis et al. .................. 523/160
2006/0025498 A1 * 2/2006 Fukushige et al. ............ 523/160
2009/0031579 A1 * 2/2009 Piatt et al. ......................... 34/82

FOREIGN PATENT DOCUMENTS

JP 10-287035 A 10/1998
JP 2004-189930 A 7/2004

* cited by examiner

*Primary Examiner* — Laura Martin
(74) *Attorney, Agent, or Firm* — SOLARIS Intellectual Property Group, PLLC

(57) ABSTRACT

An image forming method includes: applying an ink composition including a pigment having a volume average particle diameter of 70 nm to 130 nm, a polymerizable compound, and water, onto a recording medium using an inkjet under a condition that a maximum application amount of the ink composition is 15 ml/$m^2$ or less; applying, onto the recording medium, a treatment liquid including an aggregating agent that is capable of aggregating components in the ink composition; removing at least a part of the water contained in the ink composition that has been applied onto the recording medium, under a drying condition such that 60% by mass to 80% by mass of the water contained in the ink composition applied at the maximum application amount is removed, thereby performing drying; and irradiating, with an active energy ray, the ink composition from which water has been removed, thereby performing polymerization.

7 Claims, 1 Drawing Sheet

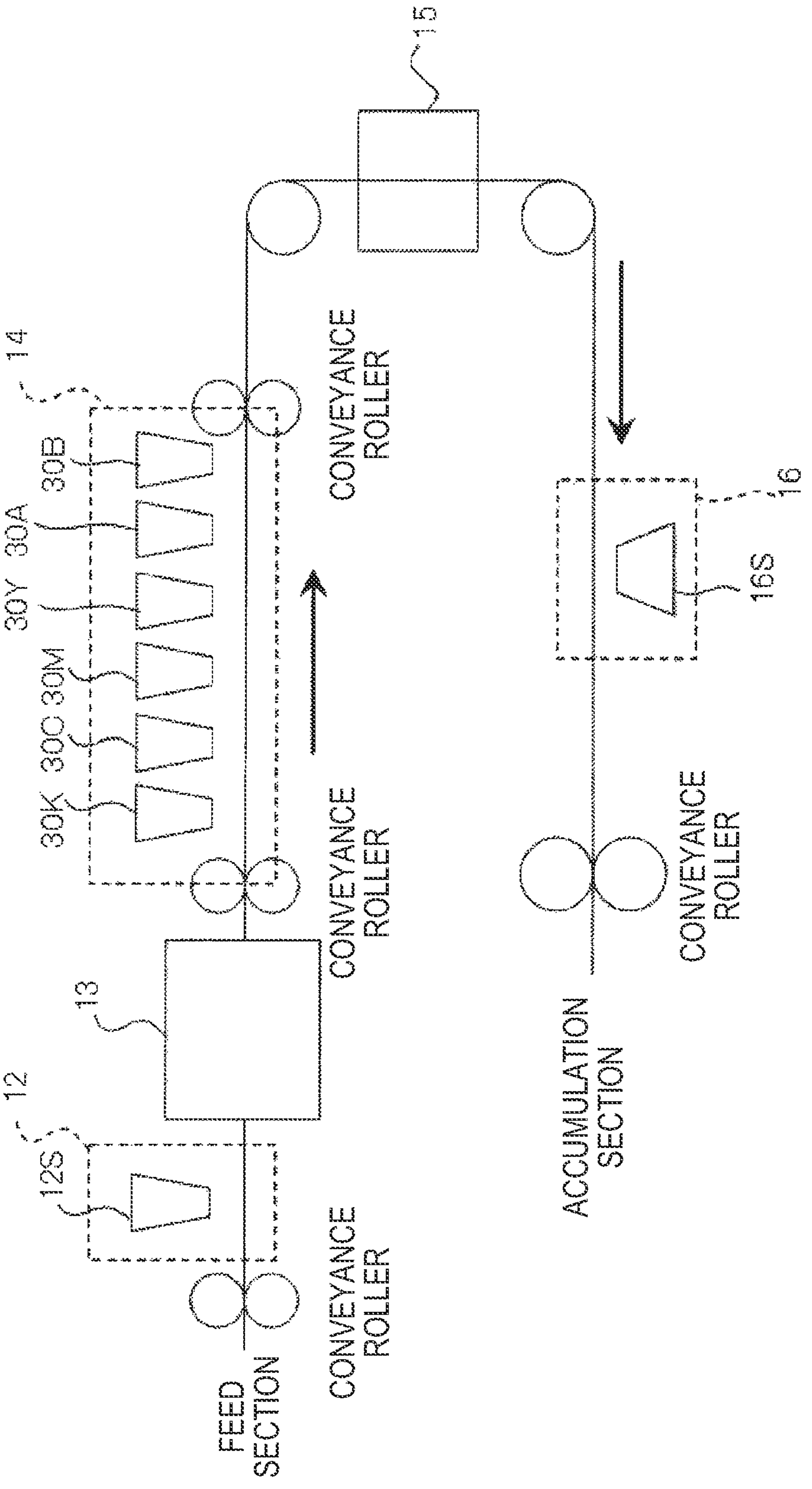
15
14
30B
30A
30Y
30M
30C
30K
13
12
12S
16
16S
CONVEYANCE ROLLER
CONVEYANCE ROLLER
CONVEYANCE ROLLER
CONVEYANCE ROLLER
FEED SECTION
ACCUMULATION SECTION

IMAGE FORMING METHOD

CROSS-REFERENCE TO RELATED APPLICATION

This Application claims priority under 35 USC 119 from Japanese Patent Application No. 2010-044559, filed on Mar. 1, 2010, the disclosure of which is incorporated by reference herein.

BACKGROUND OF THE INVENTION

1. Field of Invention

The present invention relates to an image forming method.

2. Description of the Related Art

In recent years, various methods have been proposed as image recording methods for recording color images. However, regardless of the method, there remains strong demand for a recorded product having high quality in terms of image quality, texture, reduced curling after recording, and the like.

For example, inkjet techniques have been applied to the fields of office printers, home printers, and the like, and have recently begun to be applied to commercial printing. In the field of commercial printing, printed sheets are required to have a printing texture similar to that of general printing paper, rather than a surface such as that of paper used exclusively for inkjet recording, which has a solvent absorbing layer coated on a resin-coated paper and which completely blocks penetration of an ink solvent into the base paper. However, the range of properties such as surface gloss, texture, and stiffness of the recording medium is limited when a recording medium has a solvent absorption layer with a thickness of as much as 20 μm to 30 μm. Therefore, application of inkjet techniques to the commercial printing field has been limited, for example, to posters, vouchers, and the like with respect to which the restrictions on surface gloss, texture, stiffness, and the like on a recording medium are tolerable.

Furthermore, paper exclusively used for inkjet recording has high production costs since a solvent-absorbing layer and a water-resistant layer are included therein, which is one of the factors that limits application of inkjet techniques to the commercial printing field.

Further, a pigment is widely used as a colorant, which is one of components of an ink material. When a pigment is used, the pigment is dispersed in a medium such as water. When the pigment is dispersed and used, a dispersion diameter, post-dispersing stability, size uniformity, or the like when particles are dispersed, and jettability from jetting heads and the like are important. Techniques that improve such properties have been widely studied.

Moreover, there are cases in which pigment-containing inks do not have satisfactory properties in terms of fixability (for example, abrasion resistance), water resistance, stain resistance, or the like since such inks generally remain on the surface of a recording medium rather than penetrating into the recording medium.

In relation to the above, an inkjet recording method in which an ink composition including a polymerizable compound and a reaction liquid including a photopolymerization initiator and a reactant that produces an aggregate when contacting with the ink composition are used, has been disclosed (see, for example, Japanese Patent Application Laid-Open (JP-A) No. 10-287035).

Furthermore, a water-based photocurable ink including a polymerizable compound at a content of 30% by mass to 70% by mass, a photopolymerization initiator, a colorant, and water has been disclosed (see, for example, JP-A No. 2004-189930).

SUMMARY OF THE INVENTION

However, in the ink composition described in JP-A No. 10-287035 and the water-based photocurable ink described in JP-A No. 2004-189930, since the main solvent forming the ink is water, deformation such as cockling or the like occurs on the recording medium onto which the ink droplets have been jetted in some cases, and in a cured image formed on a recording medium with deformation such as cockling or the like, image strength in terms of adhesiveness and the like is decreased in some cases.

According to a first aspect of the invention, there is provided an image forming method including:

applying an ink composition including a pigment having a volume average particle diameter of 70 nm to 130 nm, a polymerizable compound, and water, onto a recording medium using an inkjet under a condition that a maximum application amount of the ink composition is 15 ml/$m^2$ or less;

applying, onto the recording medium, a treatment liquid including an aggregating agent that is capable of aggregating components in the ink composition;

removing at least a part of the water contained in the ink composition that has been applied onto the recording medium in the applying of the ink composition, under a drying condition such that 60% by mass to 80% by mass of the water contained in the ink composition applied at the maximum application amount is removed, thereby performing drying; and irradiating, with an active energy ray, the ink composition from which water has been removed, thereby performing polymerization.

BRIEF DESCRIPTION OF THE DRAWINGS

FIG. 1 is a schematic diagram showing an example of the configuration of an inkjet recording device that is used to perform the image forming method of the present invention.

DETAILED DESCRIPTION OF THE INVENTION

The image forming method of the present invention includes applying an ink composition including a pigment having a volume average particle diameter of 70 nm to 130 nm, a polymerizable compound, and water, onto a recording medium using an inkjet under a condition that a maximum application amount of the ink composition is 15 ml/$m^2$ or less (ink application process); applying, onto the recording medium, a treatment liquid including an aggregating agent that aggregates components in the ink composition (treatment liquid application process); removing at least a part of the water contained in the ink composition that has been applied onto the recording medium in the applying of the ink composition, under a drying condition such that 60% by mass to 80% by mass of the water contained in the ink composition applied at the maximum application amount is removed, thereby performing drying (drying process); and irradiating, with an active energy ray, the ink composition from which water has been removed, thereby performing polymerization (polymerization process).

When an ink composition which contains a pigment having a volume average particle diameter in a specific range is used and the drying process, in which water is removed from the ink composition applied onto the recording medium under a specific drying condition defined depending on the maximum application amount of the ink composition is included, deformation of the cured image caused by cockling is inhibited and a cured image having excellent adhesiveness to the recording medium can be formed.

Ink Application Process

In the ink application process, an ink composition containing a pigment having a volume average particle diameter of from 70 nm to 130 nm, a polymerizable compound, and water is applied onto a recording medium using an inkjet under a condition that a maximum application amount of the ink composition is 15 ml/$m^2$ or less. Details of the ink composition used in the present invention is described below.

Specifically, image recording by an ink jet method may be conducted by jetting an ink composition onto a desired recording medium by application of energy. The recording medium is, for example, a common paper, a high quality paper, a coat paper, an art paper, a resin coated paper, a paper exclusively for ink jet recording described in, for example, JP-A No. 8-169172, JP-A No. 8-27693, JP-A No. 2-276670, JP-A No. 7-276789, JP-A No. 9-323475, JP-A. No. 62-238783, JP-A. No. 10-153989, JP-A. No. 10-217473, JP-A. No. 10-235995, JP-A. No. 10-337947, JP-A. No. 10-217597, and JP-A 10-337947, a film, an electrophotographic paper, a fabric, glass, a metal, and a ceramic. Examples of preferable ink jet recording methods for the present invention may include a method described in paragraphs [0093] to [0105] of JP-A. No. 2003-306623.

The ink jet method is not particularly limited, and may be any known method such as a charge-control method in which an ink is jetted by an electrostatic attraction force, a drop-on-demand method (pressure-pulse method) in which a pressure of oscillation of a piezo element is utilized, an acoustic ink jet method in which an ink is jetted by radiation pressure generated by irradiation of ink with acoustic beams that have been converted from electrical signals, and a thermal ink jet (BUBBLE JET (registered trade mark)) method in which an ink is jetted by a pressure generated by formation of bubbles caused by heating of the ink. The scope of the ink jet method may include a method in which a large number of small-volume droplets of an ink having a low optical density, which is called a photo ink, are jetted, a method in which plural inks with substantially the same hue but different densities are used to improve image quality, and a method in which a colorless and transparent ink is used.

The inkjet head used in an inkjet method may be either an on-demand type head or a continuous type head.

Also, the ink nozzle or the like used when recording is carried out by the inkjet method is not particularly limited, and may be selected appropriately according to the purposes.

Examples of the ink jet method include (i) a shuttle mode in which recording is performed while a short serial head having a small length is moved in the width direction of a recording medium in a scanning manner, and (ii) a line mode in which a line head having recording devices that are aligned correspondingly to the entire length of one side of a recording medium is used. In the line mode, image recording can be performed over the whole of one surface of a recording medium by moving the recording medium in a direction orthogonal to the disposal direction along which the recording devices are aligned, and a conveyance system such as a carriage that moves the short head in a scanning manner is not required. Since complicated scan-movement control of the movement of the carriage and the recording medium is not required and only the recording medium is moved, a faster recording speed can be achieved compared to the shuttle mode. The image forming method according to the present invention may be applied to both of these modes, but when the ink jet recording method according to the present invention is applied to a line mode, in which dummy jetting is not generally conducted, the effects in improvement of jetting accuracy and the abrasion resistance of an image are significant.

The amount of the ink droplets jetted from an inkjet head is preferably from 1 pl (picoliter) to 10 pl, and more preferably from 1.5 pl to 6 pl, from the viewpoints of obtaining a high-precision image. It is also effective to jet liquid droplets of different amounts in combination, from the viewpoints of suppressing unevenness in an image and improving smoothness in continuous gradation. Jetting liquid droplets of different amounts in combination may be favorably applied to the present invention.

In the present invention, the maximum application amount of the ink composition onto the recording medium is 15 ml/$m^2$ or less, but from the viewpoints of the image adhesiveness and the image density, it is preferably from 8 ml/$m^2$ to 15 ml/$m^2$, more preferably from 8 ml/$m^2$ to 12 ml/$m^2$, and further more preferably from 8 ml/$m^2$ to 11 ml/$m^2$. When the maximum application amount is more than 15 ml/$m^2$, the adhesiveness of the image may be decreased in some cases.

Treatment Liquid Application Process

In the treatment liquid application process, a treatment liquid including an aggregating agent that aggregates components in the ink composition is applied onto the recording medium.

The applied treatment liquid contacts with the ink composition to form an image. In this case, dispersed particles in the ink composition such as the pigment, the polymer particles, and the like are aggregated, whereby the image is fixed onto the recording medium. The treatment liquid includes at least an aggregating agent, and details and preferred embodiments of the respective components are described below.

The treatment liquid may be applied by a known method such as a coating method, an ink jet method, or an immersion method. Examples of the coating method include known coating methods using a direct gravure coater, an offset gravure coater, an extrusion die coater, an air doctor coater, a blade coater, a rod coater, a knife coater, a squeeze coater, a reverse roll coater, and a bar coater. Details of the ink jet method are the same as those described above.

The treatment liquid application process may be performed before or after the ink application process using the ink composition. In the present invention, an embodiment in which the ink application process is performed after the treatment liquid is applied in the treatment liquid application process is preferable. Specifically, it is preferable that the treatment liquid for aggregating the pigment and/or self-dispersing polymer particles in the ink composition is applied in advance on the recording medium prior to applying the ink composition, and the ink composition is applied so as to contacts with the treatment liquid provided on the recording medium, whereby an image is formed. As a result, inkjet recording can be performed at a higher speed, and an image having high density and resolution can be obtained even when recording is performed at a high speed.

The amount of the treatment liquid to be applied is not particularly limited as long as the ink composition can be aggregated, and is preferably an amount such that the amount of the aggregating agent to be applied is 0.1 g/$m^2$ or more. The amount of the aggregating agent to be applied is more preferably from 0.2 g/$m^2$ to 0.7 g/$m^2$. When the amount of the aggregating agent to be applied is 0.1 g/$m^2$ or more, superior high-speed aggregation properties which are suitable for various modes of the use of the ink composition can be maintained. Further, it is preferable that the amount of the aggregating agent to be applied is 0.7 $g/m^2$ or less so that there is no disadvantageous influence on the surface properties (such as change in gloss and the like) of the recording medium to which the treatment liquid is applied.

In the present invention, it is preferable that the ink application process is performed after the treatment liquid application process, and further, a heat-drying process of drying the treatment liquid on a recording medium by heating is performed during a time period after the application of the treatment liquid on a recording medium until the application of the ink composition. By drying the treatment liquid by heating prior to the ink application process, the ink coloring properties such as suppression of bleed are improved, and a visible image having superior color density and hue can be recorded.

The drying by heating may be performed by a known heating means such as a heater or the like, or an air-blowing means using air-blowing by a drier or the like, or a means having a combination thereof. Examples of heating methods include a method of supplying heat from the side of the recording medium opposite to the surface on which the treatment liquid has been applied using a heater or the like, a method of blowing warm air or hot air to the recording medium on which the treatment liquid has been applied, and a heating method using an infrared heater, and a combination of two or more of the above methods.

Drying Process

In the drying process, at least a part of the water contained in the ink composition that has been applied onto the recording medium in the applying of the ink composition is removed, under a drying condition such that 60% by mass to 80% by mass of the water contained in the ink composition applied at the maximum application amount is removed (which may be hereinafter referred to as a "drying amount" in some cases), thereby performing drying. When the amount of water to be removed is less than 60% by mass, cockling is not sufficiently suppressed and the adhesiveness of the image is decreased in some cases. Further, when more than 80% by mass of water is removed, the adhesiveness of the image is decreased in some cases.

The drying conditions in the present invention are set on the basis of the maximum application amount of the ink composition in the ink application process, which can be appropriately set as necessary. When water is removed from the ink composition which has been applied onto the recording medium and which contains a pigment having a volume average particle diameter of from 70 nm to 130 nm under such a drying condition, the occurrence of cockling is suppressed and an image having excellent adhesiveness can be formed.

The drying amount in the drying process is calculated in the following manner. A moisture amount $W_0$ contained in an image formed at the maximum application amount of the ink without performance of the drying process, and a moisture amount $W_1$ contained in an image formed at the maximum application amount of the ink with performance of the drying process under a predetermined drying condition are measured, respectively. Then, a ratio of the difference between $W_0$ and $W_1$ to $W_0$ ($(W_0-W_1)/W_0$ (% by mass)) is determined to obtain the drying amount (% by mass) as a moisture amount removed by the drying process.

The moisture amount contained in the image formed in the present invention is measured by a Karl Fischer method. As the moisture amount of the present invention, a moisture amount as measured using a Karl Fischer moisture meter MKA-520 (trade name, manufactured by Kyoto Electronics Manufacturing Co., Ltd.) under usual measurement conditions is employed.

The drying amount in the drying process in the present invention is from 60% by mass to 80% by mass. The drying amount is preferably from 65% by mass to 80% by mass, and more preferably from 70% by mass to 80% by mass, with respect to the total moisture amount of the ink composition applied at a maximum application amount.

Furthermore, the method for removing water in the drying process is not particularly limited, but it is preferable to remove water by heating treatment.

The heating method is not particularly limited, but preferable examples thereof include drying methods without direct contact such as a heating method using a heating member (such as a nichrome wire heater), a method of supplying warm air or hot air, or a heating method of using a halogen lamp or an infrared ray lamp.

Polymerization Process

In the polymerization process, the ink composition in which the part of water contained in the ink composition has been removed in the drying process is irradiated with an active energy ray. By irradiation with an active energy ray, the polymerizable compound in the ink composition is polymerized, thereby forming a cured film containing a pigment. The image formed thereby has further improved abrasion resistance.

The active energy ray used in the present invention is not particularly limited as long as it is capable of polymerizing the polymerizable compound, but examples thereof include an ultraviolet ray, and an electron beam. Among these, from the viewpoints of wider application, an ultraviolet ray is preferable.

Ultraviolet Ray Irradiation Lamp

As a method for irradiation with an ultraviolet ray, a generally used method can be used, and in particular, an ultraviolet ray irradiation lamp is preferably used.

As the ultraviolet ray irradiation lamp, a low-pressure mercury lamp having a vapor pressure of mercury of from 1 Pa to 10 Pa during irradiation, a high-pressure mercury lamp, a mercury lamp applied with a fluorescent body, a UV-LED light source, and the like are preferable. The light-emitting spectrum in an ultraviolet ray region of the mercury lamp and the UV-LED is in the range of 450 nm or less, and particularly from 184 nm to 450 nm, and is suitable for efficient reaction of the polymerizable compound in a black or colored ink composition. Further, since a small-size power source can also be used when installing the power source in a printer, the mercury lamp and the UV-LED are thus preferable. As the mercury lamp, a metal halide lamp, a high-pressure mercury lamp, an ultra-high-pressure mercury lamp, a xenon flash lamp, a deep UV lamp, a lamp which excites a mercury lamp from the outside without an electrode using a microwave, a UV laser, and the like are used in practice. Since the light-emitting wavelength region thereof is in the above range, as long as the power size, input intensity, lamp shape, and the like of the mercury lamp are acceptable, the mercury lamp can be basically employed. A light source is selected according to the sensitivity of the polymerization initiator to be used.

The ultraviolet ray intensity required is preferably from 500 $mW/cm^2$ to 5000 $mW/cm^2$ in a wavelength region which is effective for curing. When the irradiation intensity is low, formation of an image having high quality grade and fastness is not accomplished. In addition, when irradiation intensity is too high, the recording medium is damaged or may result in discoloration of the colorant in some cases.

Recording Medium

According to the image forming method of the present invention, an image is recorded on a recording medium.

The recording medium is not particularly limited, and may be a general printing paper containing cellulose as the major component such as high-quality paper, coat paper, or art paper, which is used for general offset printing and the like. When image recording is performed on the general printing paper containing cellulose as the major component by a general ink jet method using an aqueous ink, absorption and drying of the ink is relatively slow, and colorant migration easily occurs after jetting ink droplets, whereby image quality is apt to degrade. In contrast, when image recording is conducted by the image forming method according to the present invention, a high-grade image recording having excellent color density and hue can be achieved while suppressing the colorant migration.

The recording medium may be a commercially-available product, and examples thereof include high-quality papers (A) such as PRINCE WOOD FREE (tradename) manufactured by Oji Paper Co., Ltd., SHIRAOI (tradename) manufactured by Nippon Paper Industries Co., Ltd., and New NPI jo-shitsu (New NPI high-quality; tradename) manufactured by Nippon Paper Industries Co., Ltd.; very light-weight coated papers such as EVER LIGHT COATED (tradename) manufactured by Oji Paper Co., Ltd. and AURORA S (tradename) manufactured by Nippon Paper Industries Co., Ltd.; lightweight coat papers (A3) such as TOPKOTE (L) (tradename) manufactured by Oji Paper Co., Ltd. and AURORA L (tradename) manufactured by Nippon Paper Industries Co., Ltd.; coat papers (A2, B2) such as TOPKOTE PLUS (tradename) manufactured by Oji Paper Co., Ltd. and AURORA COAT (tradename) manufactured by Nippon Paper Industries Co., Ltd.; and art papers (A1) such as KINFUJI(2/SIDE GOLDEN CASK GLOSS) (tradename) manufactured by Oji Paper Co., Ltd. and TOKUBISHI ART (tradename) manufactured by Mitsubishi Paper Mills Ltd. As the recording medium, various inkjet-recording papers exclusively for photos may be used.

Among these recording media, a coated paper, which is used for general offset printing, is preferable. The coated paper is produced generally by coating a surface of a base paper which contains cellulose as a main component and has not been subjected to surface treatment such as high-quality paper, neutral paper, and the like with a coating material containing an inorganic pigment so as to form a coating layer. When image formation is performed by a typical aqueous inkjet, the coated paper easily causes problems in quality such as image gloss, abrasion resistance, and the like. However, unevenness in gloss is suppressed and an image having excellent gloss and abrasion resistance can be obtained according to the image forming method of the present invention. In particular, it is preferable to use a coated paper having a base paper and a coated layer including an inorganic pigment, and it is more preferable to use a coated paper having a base paper and a coated layer including kaolin and/or calcium bicarbonate. Specifically, an art paper, a coat paper, a light-weight coat paper, and a very light-weight coated paper are preferable.

Ink Composition

The ink composition in the present invention (hereinafter, which may be referred to as simply "ink" in some cases) includes at least one pigment having a volume average particle diameter of from 70 nm to 130 nm, at least one polymerizable compound that is polymerized by an active energy ray, and water, and optionally further includes a polymerization initiator that initiates the polymerization of the polymerizable compound by an active energy ray, a dispersant, resin particles, a surfactant, and other components.

Pigment

The ink composition in the present invention includes at least one pigment as a coloring material component. The pigment is not particularly limited, and may be selected appropriately according to the purpose. For example, the pigment may be an organic pigment or an inorganic pigment. The pigment is preferably almost completely insoluble in water or hardly soluble in water in consideration of ink coloring properties.

Examples of the organic pigment include an azo pigment, a polycyclic pigment, a dye chelate, a nitro pigment, a nitroso pigment, and aniline black. Among these, an azo pigment and a polycyclic pigment are preferable. Examples of the inorganic pigment include titanium oxide, iron oxide, calcium carbonate, barium sulfate, aluminum hydroxide, barium yellow, cadmium red, chrome yellow, and carbon black. Among these, carbon black is particularly preferable.

Specific examples of the pigment that may be used in the present invention include the pigments described in paragraphs [0142] to [0145] of JP-A No. 2007-100071, and the like.

The pigments may be used alone or in combination of two or more kinds thereof.

The pigment in the present invention has a volume average particle diameter of from 70 nm to 130 nm, but it is preferably from 80 nm to 120 nm, and more preferably from 85 nm to 110 nm, from the viewpoints of jettability and suppression of cockling. Further, the particle diameter distribution of the pigment is not particularly limited, but it may be either a wide particle diameter distribution or a mono-dispersed particle diameter distribution. Two or more pigments having mono-dispersed particle diameter distributions may be mixed and used.

Herein, the volume average particle diameter of the pigment indicates a volume average particle diameter when an ink is formed, but this applies to a concentrated ink dispersion which is in a previous phase before the ink is formed.

The volume average particle diameter and the particle diameter distribution of the pigment in the dispersion state are determined by a dynamic light scattering method using a MICROTRAC particle size distribution meter (Version 10.1.2-211 BH (trade name), manufactured by Nikkiso Co., Ltd.).

The volume average particle diameter of the pigment in the present invention may be adjusted by a generally used method. For example, by appropriately selecting a dispersion time or the like during preparation of a pigment dispersion liquid using the dispersant as described below, the volume average particle diameter of the pigment can be adjusted to a desired range.

The content of the pigment is preferably from 1% by mass to 25% by mass, more preferably from 2% by mass to 20% by mass, further preferably from 5% by mass to 20% by mass, and particularly preferably from 5% by mass to 15% by mass, with respect to the total mass of the ink composition.

Dispersant

The ink composition of the present invention may contain at least one dispersant. The dispersant for the pigment may be either a polymeric dispersant or a low-molecular-weight surfactant-type dispersant. However, the dispersant is preferably a polymeric dispersant from the viewpoints of dispersion stability and jettability. The polymeric dispersant may be either a water-soluble dispersant or a water-insoluble dispersant.

The low-molecular-weight surfactant-type dispersant can maintain a low viscosity level of an ink and stably disperse a pigment in an aqueous solvent. The low-molecular-weight surfactant-type dispersant refers to a low-molecular-weight dispersant having a molecular weight of 2,000 or less. The molecular weight of the low-molecular-weight surfactant-type dispersant is preferably from 100 to 2,000, and more preferably from 200 to 2,000.

The low-molecular-weight surfactant-type dispersant has a structure including a hydrophilic group and a hydrophobic group. Each of at least one hydrophilic group and at least one hydrophobic group may be contained in one molecule independently. The low-molecular-weight surfactant-type dispersant may include plural kinds of hydrophilic groups and hydrophobic groups, respectively, and may optionally contain a linking group for connecting a hydrophilic group and a hydrophobic group.

The hydrophilic group may be an anionic group, a cationic group, a nonionic group, and a betine-type which is a combination thereof. The anionic group is not particularly restricted as long as the anionic group has a negative charge. However, the anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group or a carboxylic acid group, and still more preferably a carboxylic acid group. The cationic group is not particularly restricted as long as the cationic group has a positive charge. However, the cationic group is preferably an organic cationic substituent, is more preferably a cationic group containing a nitrogen atom or phosphorous atom, and still more preferably a pyridinium cation or an ammonium cation. Examples of the nonionic group include polyethylene oxide, polyglycerin, and a sugar unit of a certain kind The hydrophilic group is preferably an anionic group. The anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group or a carboxylic acid group, and still more preferably a carboxylic acid group.

When the low-molecular-weight surfactant-type dispersant has an anionic hydrophilic group, from the viewpoints of accelerating an aggregation reaction bringing the low-molecular-weight surfactant-type dispersant into contact with an acidic treatment liquid, the pKa thereof is preferably 3 or more. The pKa of a low-molecular-weight surfactant-type dispersant refers to a value experimentally obtained from a titration curve obtained in such a manner that a liquid in which a low-molecular-weight surfactant-type dispersant is dissolved in a solution of tetrahydrofuran and water (3:2=V/V) at a concentration of 1 mmol/L is titrated with an acidic or alkaline solution. When the pKa of a low-molecular-weight surfactant-type dispersant is 3 or more, theoretically, 50% or more of anionic groups is in an undissociated state when the low-molecular-weight surfactant-type dispersant is brought into contact with a liquid with a pH of about 3. Therefore, the water solubility of the low-molecular-weight surfactant-type dispersant remarkably decreases and aggregation reaction takes place. That is, aggregation reactivity is improved. From this point of view, it is preferable that the low-molecular-weight surfactant-type dispersant has a carboxylic acid groups as an anionic group.

The hydrophobic group may have any structures containing a hydrocarbon, a fluorocarbon, a silicone, or the like, it is particularly preferable that the hydrophobic group has a structure containing a hydrocarbon. The hydrophobic group may either have a straight-chained structure or a branched structure. The hydrophobic group may have a structure with a single chain or a structure with two or more chains, and when the hydrophobic group has a structure with two or more chains, the hydrophobic group may contain plural kinds of hydrophobic groups.

The hydrophobic group has preferably a hydrocarbon group having from 2 to 24 carbon atoms, more preferably a hydrocarbon group having from 4 to 24 carbon atoms, and still more preferably a hydrocarbon group having from 6 to 20 carbon atoms.

Among the polymer dispersant, as the water-soluble dispersant, a hydrophilic polymer compound may be used. Examples of the natural hydrophilic polymer compound include plant-derived polymers such as gum arabic, gum tragan, guar gum, karaya gum, locust bean gum, arabinogalacton, pectin, or queens seed starch; sea weed-derived polymers such as alginic acid, carrageenan, or agar; animal-derived polymers such as gelatin, casein, albumen, or collagen; and microorganism-derived polymers such as xanthan gum or dextran.

Examples of the hydrophilic polymer compound formed by chemically modifying a natural product as a raw material include cellulose polymers such as methyl cellulose, ethyl cellulose, hydroxyethyl cellulose, hydroxypropyl cellulose, or carboxymethyl cellulose; starch polymers such as sodium starch glycolate or sodium starch phosphate ester; and sea weed polymers such as sodium alginate or propylene glycol ester alginate.

Examples of synthetic hydrophilic polymer compounds include vinyl polymers such as polyvinyl alcohol, polyvinyl pyrrolidone, or polyvinyl methyl ether; acrylic resins such as non-crosslinked polyacrylamide, polyacrylic acid or an alkali metal salt thereof or water-soluble styrene acrylic resin; water-soluble styrene maleic acid resins; water-soluble vinyl naphthalene acrylic resins; water-soluble vinyl naphthalene maleic acid resins; polyvinylpyrrolidone; polyvinylalcohol; an alkali metal salt of β-naphthalenesulfonic acid-formalin condensate; polymer compounds having a salt of cationic functional group such as a quaternary ammonium or an amino group at the side chain; and natural polymer compounds such as shellac.

Among these, the hydrophilic polymer compound is preferably a water-soluble dispersant in which a carboxyl group is introduced therein. Examples thereof include a homopolymer of such as an acrylic acid, a methacrylic acid, or a styrene-acrylic acid; and a copolymer of monomers including other hydrophilic groups.

Among these polymer dispersants, as the water-insoluble dispersant, a polymer having both a hydrophobic moiety and a hydrophilic moiety may be used. Examples thereof include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a vinyl acetate-maleic acid copolymer, and styrene-maleic acid copolymer.

The weight-average molecular weight of the polymer dispersant is preferably from 3,000 to 100,000, more preferably from 5,000 to 50,000, still more preferably from 5,000 to 40,000, and particularly preferably from 10,000 to 40,000.

The acid value of the polymer dispersant is preferably 200 mgKOH/g or less from the viewpoints of good aggregation properties when contacting with the treatment liquid. Further, the acid value is more preferably from 25 mgKOH/g to 180 mgKOH/g, further preferably from 25 mgKOH/g to 150 mgKOH/g, and particularly preferably from 30 mgKOH/g to 130 mgKOH/g. When the acid value of the polymer dispersant is 200 mgKOH/g or less, even 150 mgKOH/g or less, the pigment becomes relatively hydrophobic, whereby the water resistance of the image is better. When the acid value of the polymer dispersant is 25 mgKOH/g or more, the stability of the self-dispersibility is good.

The polymer dispersant preferably includes a polymer having a carboxyl group, more preferably a polymer having a carboxyl group and an acid value of from 25 mgKOH/g to 150 mgKOH/g, and further preferably a polymer having a carboxyl group and an acid value of from 30 mgKOH/g to 130 mgKOH/g, from the viewpoints of the self-dispersibility and the aggregation speed at the time when coming in contact with the treatment liquid.

The mass mixing ratio (p:s) of a pigment (p) and a dispersant (s) is preferably in a range of from 1:0.06 to 1:3, more preferably in a range of from 1:0.125 to 1:2, and still more preferably from 1:0.125 to 1:1.5.

In the present invention, as a coloring material, a pigment is contained but a dye may also be contained, if necessary. When the dye is used as a coloring material, a water-insoluble carrier having a dye held thereon can be used as a water-insoluble coloring particle. The dye may be selected from known dyes and used without a particular restriction. The dyes described in, for example, JP-A Nos. 2001-115066, 2001-335714, 2002-249677, and the like may also be used preferably in the present invention. The carrier is not particularly limited as long as the carrier is insoluble in water or hardly soluble in water, and the carrier may be an inorganic material, an organic material, or a composite material thereof. Specifically, the carriers described in, for example, JP-A Nos. 2001-181549, 2007-169418, and the like may be used preferably in the present invention.

The carrier retaining the dye (water-insoluble coloring particle) may be used in the form of a water-based dispersion using a dispersant. As the dispersant, the above-mentioned dispersants may be preferably used.

In the present invention, the ink composition preferably includes a pigment and a dispersant, more preferably includes an organic pigment and a polymer dispersant, and particularly preferably includes an organic pigment and a polymer dispersant containing a carboxyl group, from the viewpoints of light resistance, quality, and the like of the image. Further, from the viewpoints of aggregation properties, it is preferable that at least a part of the surface of the pigment is coated with a polymer dispersant having a carboxyl group and the pigment is water insoluble.

Resin Particles

The inkjet recording liquid of the present invention preferably contains at least one kind of resin particles. The resin particles have a function to fix the ink composition by destabilizing and aggregating the dispersion, thereby thickening the ink, when contacting with the below-mentioned treatment liquid or an area on which the treatment liquid has been applied and dried, and can further improve the fixability of the ink composition onto a recording medium and abrasion resistance of an image.

Examples of the resin particles or a polymer latex that may be used in the present invention include acrylic resins, vinyl acetate-based resins, styrene-butadiene-based resins, vinyl chloride-based resins, acrylic styrene-based resins, butadiene-based resins, styrene-based resins, crosslinked acrylic resins, crosslinked styrene-based resins, benzoguanamine resins, phenol resins, silicone resins, epoxy resins, urethane-based resins, paraffin-based resins, and fluorine-based resins. Preferable examples thereof include acrylic resins, acrylic-styrene-based resins, styrene-based resins, crosslinked acrylic-based resins, and crosslinked styrene-based resins.

The weight average molecular weight of the resin particle is preferably 10,000 or more and 200,000 or less, and more preferably from 100,000 to 200,000.

The average particle diameter of the resin particle is preferably in the range of from 10 nm to 1 μm, more preferably in the range of from 10 nm to 200 nm, further preferably in the range of from 20 nm to 100 nm, and particularly preferably in the range of from 20 nm to 50 nm.

The glass transition temperature Tg of the resin particle is preferably 30° C. or higher, more preferably 40° C. or higher, and further preferably 50° C. or higher.

The addition amount of the resin particles is preferably from 0.5% by mass to 20% by mass, more preferably from 3% by mass to 20% by mass, and further preferably from 5% by mass to 15% by mass, with respect to the ink.

Further, the particle diameter distribution of the resin particles is not particularly limited, and it may be either a wide particle diameter distribution or a mono-dispersed particle diameter distribution. Two or more of the resin particles having mono-dispersed particle diameter distribution may be mixed and used.

Polymerizable Compound

The ink composition in the present invention contains at least one water-soluble polymerizable compound having a polymerizable group, and undergoes polymerization when irradiated with an active energy ray. The polymerizable compound is used in combination with the pigment and the resin particles described above, and, when the ink composition contacts with the treatment liquid, and is aggregated, the polymerizable compound is incorporated into a space between particles, whereby an image is strengthened by polymerization and curing.

"Water-soluble" refers to an ability to be dissolved in water at a concentration that is equal to or more than a certain level, and may refer to an ability to be dissolved in an aqueous ink (preferably uniformly). Further, when the below-mentioned water-soluble organic solvent is added, solubility is increased, whereby a polymerizable compound may be dissolved in water (preferably uniformly). Specifically, the solubility in water is preferably 10% by mass or more, and more preferably 15% by mass or more.

From the viewpoints of avoiding inhibition of a reaction between an aggregating agent and the pigment or the resin particles, the polymerizable compound is preferably a nonionic or cationic polymerizable compound, and a polymerizable compound having a solubility in water of 10% by mass or more (more preferably 15% by mass or more) is preferable.

Examples of the nonionic polymerizable monomer include polymerizable compounds such as (meth)acrylic monomers.

Examples of the (meth)acrylic monomers include a (meth)acrylic acid ester of a polyhydric alcohol, a (meth)acrylic acid ester of a glycidyl ether of a polyhydric alcohol, a (meth)acrylic acid ester of a polyethylene glycol, a (meth)acrylic acid ester of an ethylene oxide adduct of a polyhydric alcohol, and ultraviolet ray-curable monomers or oligomers such as a reaction product between a polybasic acid anhydride and a hydroxyl group-containing (meth)acrylic acid ester.

The polyhydric alcohol may have a chain therein that is elongated by an ethylene oxide chain formed by addition of an ethylene oxide.

Specific examples (nonionic compounds 1 to 6) of the nonionic polymerizable compound are shown below, but the present invention is not limited thereto.

Nonionic compound 1

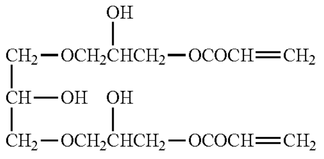

Nonionic compound 2

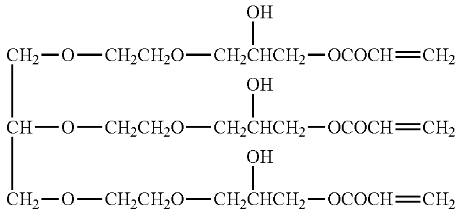

Nonionic compound 3

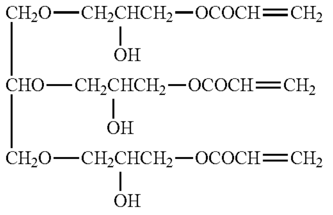

Nonionic compound 4

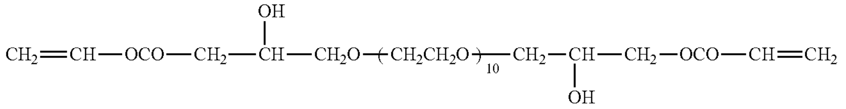

Nonionic compound 5

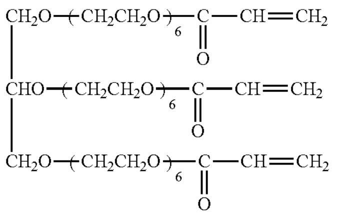

Nonionic compound 6

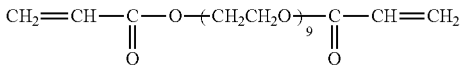

Further, an acrylic acid ester having two or more acryloyl groups in a molecule thereof that is derived from a compound having multiple hydroxyl groups may also be used. Examples of the compound having multiple hydroxyl groups include a condensate of a glycol, an oligoether, and an oligoester.

Moreover, the nonionic polymerizable compound is also preferably an (meth)acrylic acid ester of a polyol having two or more hydroxyl groups such as a monosaccharide or a disaccharide; and a (meth)acrylic acid ester of triethanolamine, diethanolamine, trishydroxyaminomethane, or trishydroxyaminoethane.

In addition, as the nonionic polymerizable compound, a water-soluble polymerizable compound having an acrylamide structure in a molecule thereof is also preferable.

Herein, the polymerizable compound having an acrylamide structure in a molecule thereof is preferably a compound represented by the following formula (1).

Formula (1)

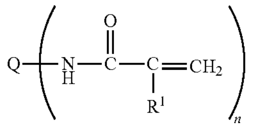

In Formula (1), Q represents an n-valent linking group, $R^1$ represents a hydrogen atom or a methyl group, and n represents an integer of 1 or more.

The compound of Formula (1) is a compound in which unsaturated vinyl monomers are connected to the linking groups Q through an amide bond. $R^1$ represents a hydrogen atom or a methyl group, and preferably a hydrogen atom. The valency n of the linking group Q is not limited; however, from the viewpoints of improving polymerization efficiency and jetting stability, n is preferably 2 or more, more preferably from 2 to 6, and still more preferably from 2 to 4.

The linking group Q is not particularly limited as long as the linking group Q is a group capable of linking with a (meth)acrylamide structure, but it is preferable that the compound represented by Formula (1) be selected from linking groups that satisfy the water-solubility condition described above. Specific examples thereof include residues obtained by removing one or more of hydrogen atoms or hydroxyl groups from a compound selected from Compound group X below.

Compound Group X

Ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane, ditrimethylolpropane, trimethylolethane, ditrimethylolethane, neopentyl glycol, pentaerythritol, dipentaerythritol and condensates thereof, low-molecular-weight polyvinyl alcohol, polyols such as sugars, and polyamines such as ethylenediamine, diethylenetriamine, triethylenetetramine, polyethyleneimine and polypropylenediamine.

Furthermore, examples thereof include a functional group having a substituted or unsubstituted alkylene chain having 4 or less carbon atoms such as a methylene group, an ethylene group, a propylene group, or a butylene group and a functional group having a saturated or unsaturated heterocycle such as a pyridine ring, an imidazole ring, a pyrazine ring, a piperidine ring, a piperazine ring, or a morpholine ring.

As the linking group Q, among the above, a residue of polyol including an oxyalkylene group (preferably a oxyethylene group) is preferable, and a residue of polyol including three or more oxyalkylene groups (preferably an oxyethylene group) are particularly preferable.

Specific examples (nonionic compounds a-i) of the compound represented by Formula (1) include, but are not limited to, those shown below.

(a)

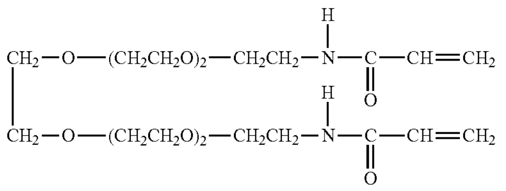

(b)

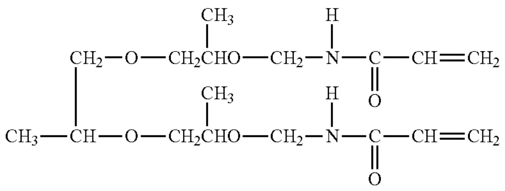

(c)

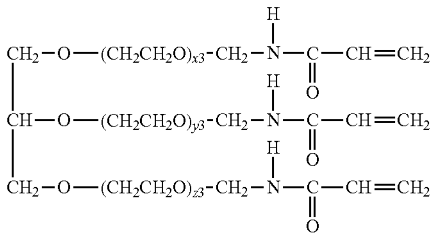

$x_3+y_3+z_3=6$ (d)

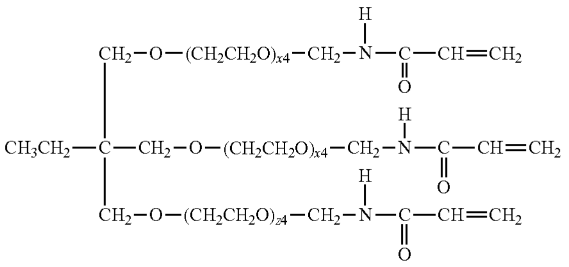

$x_4+y_4+z_4=9$ (e)

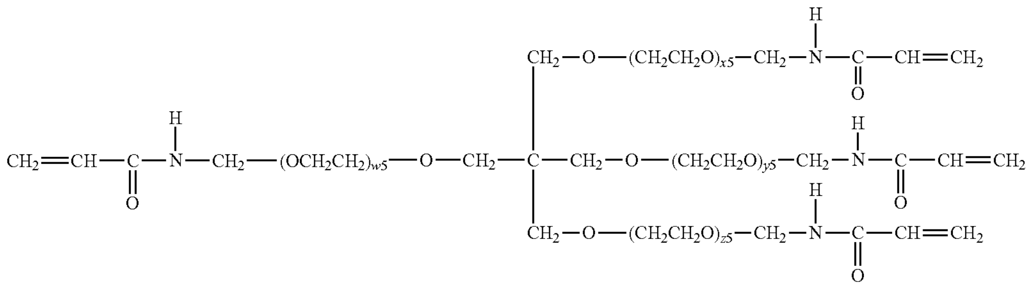

$w_5+x_5+y_5+z_5=6$ (f)

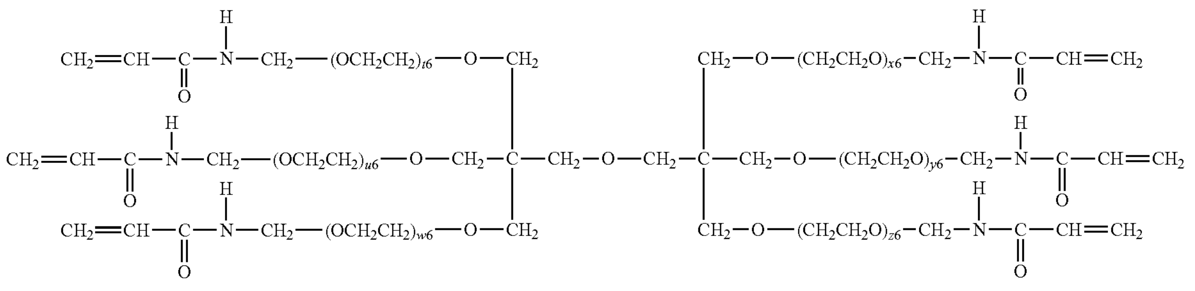

$t_6+u_6+w_6+x_6+y_6+z_6=12$

-continued (g)

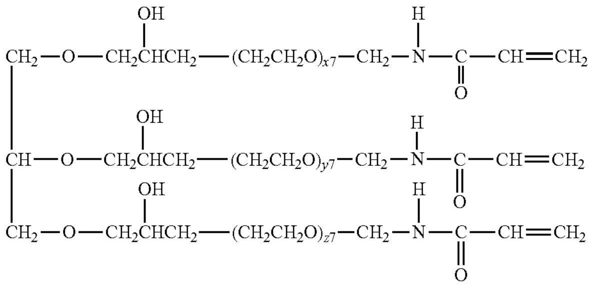

$x_7+y_7+z_7=3$ (h)

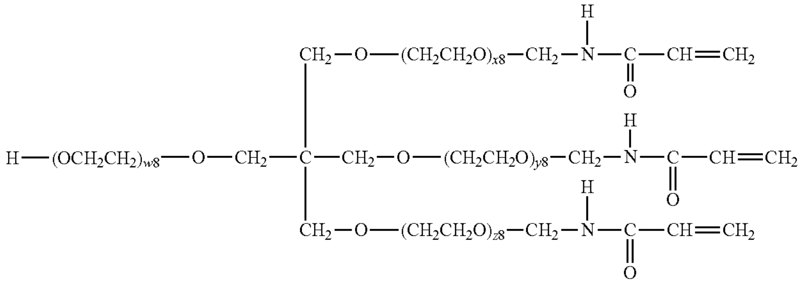

$w_8+x_8+y_8+z_8=6$ (i)

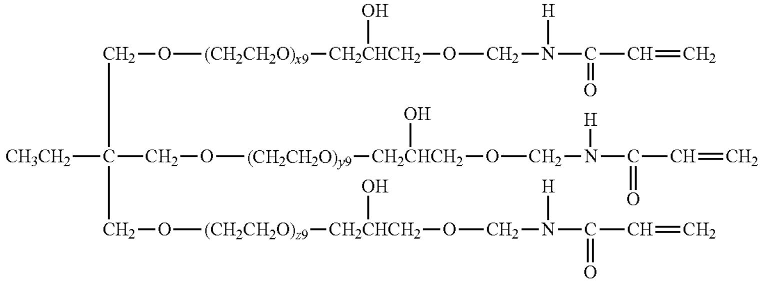

$x_9+y_9+z_9=3$

The above-described cationic polymerizable compound is a compound having a cationic group and a polymerizable group such as an unsaturated double bond, and for example, an epoxy monomer, an oxetane monomer, or the like may be preferably used. When the cationic polymerizable compound is included, the cationic property of the ink composition is increased by the presence of the cationic group, whereby intermixing of colors is more effectively prevented when an anionic ink is used.

Examples of the cationic polymerizable compound include N,N-dimethylaminoethyl methacrylate, N,N-dimethylaminoethyl acrylate, N,N-dimethylaminopropyl methacrylate, N,N-dimethylaminopropyl acrylate, N,N-dimethylaminoacrylamide, N,N-dimethylaminomethacrylamide, N,N-dimethylaminoethylacrylamide, N,N-dimethylaminoethylmethacrylamide, N,N-dimethylaminopropylacrylamide, N,N-dimethylaminopropylmethacryamide, and quaternized compounds thereof.

Examples of the epoxy monomer include a glycidyl ether of a polyhydric alcohol, a glycidyl ester, and an aliphatic cyclic epoxide.

In addition, examples of the cationic polymerizable compound include those having the following structures.

Structure 1

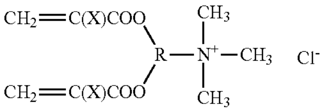

Structure 2

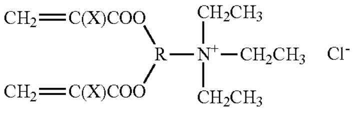

Structure 3

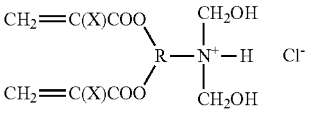

Structure 4

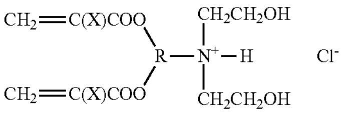

-continued

Structure 5

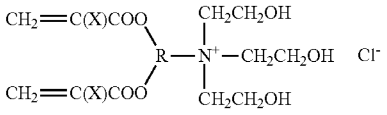

Structure 6

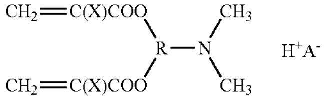

Structure 7

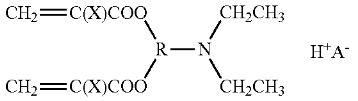

Structure 8

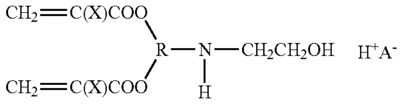

Structure 9

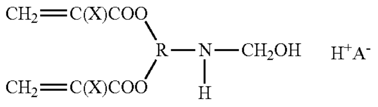

-continued

Structure 10

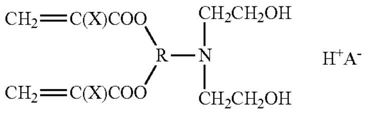

Structure 11

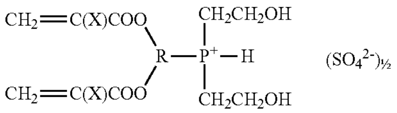

Structure 12

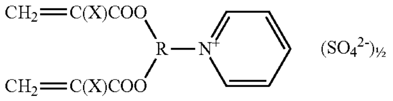

In the structure above, R represents a residue of a polyol. X represents H or $CH_3$, and $A^-$ represents $Cl^-$, $HSO_3^-$, or $CH_3COO^-$. Examples of a compound used for introducing the polyol include glycerin, 1,2,4-butanetriol, 1,2,5-pentanetriol, 1,2,6-hexanetriol, trimethylolpropane, trimethylolmethane, trimethylolethane, pentaerythritol, bisphenol A, alicyclic bisphenol A, and condensates thereof.

Specific examples of the polymerizable compound having a cationic group include those shown below (Cationic compounds 1 to 11).

Cationic compound 1

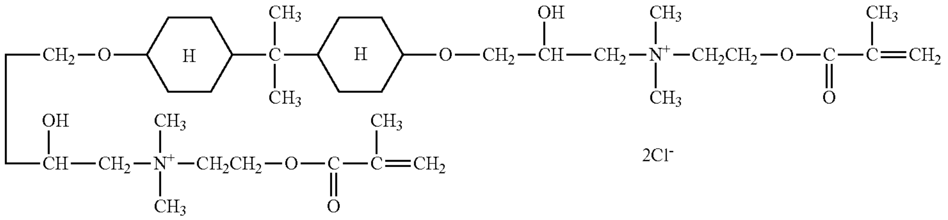

(wherein 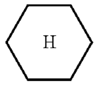 represents cyclohexane)

Cationic compound 2

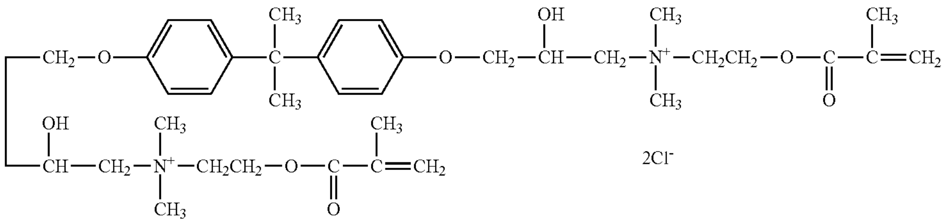

-continued
Cationic compound 3
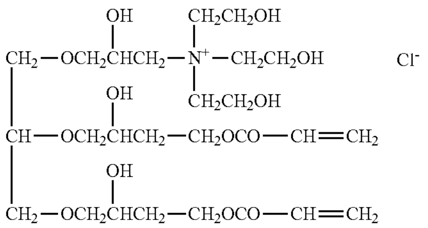
Cationic compound 4
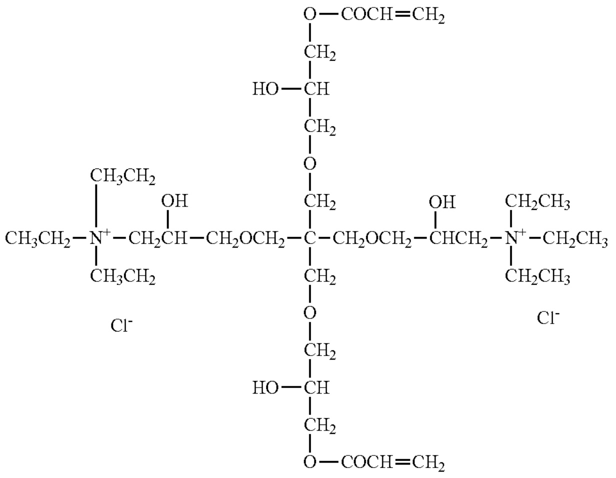
Cationic compound 5
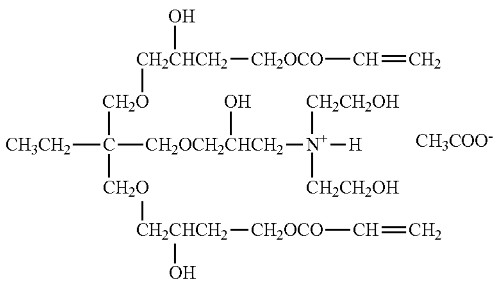
Cationic compound 6
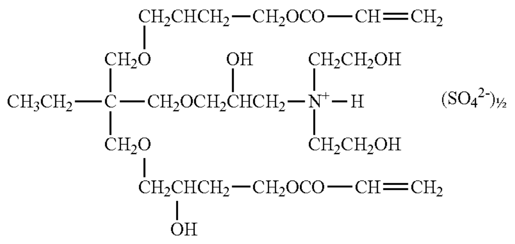
Cationic compound 7
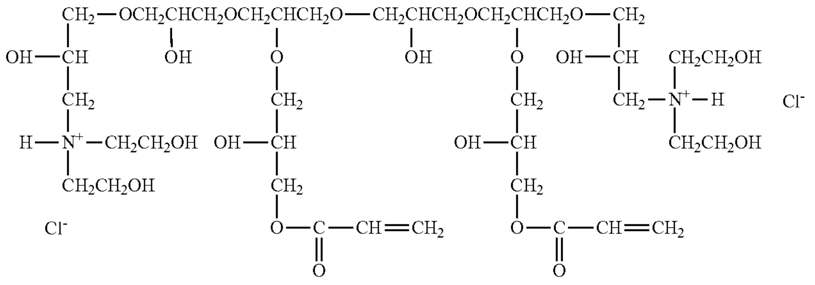
Cationic compound 8
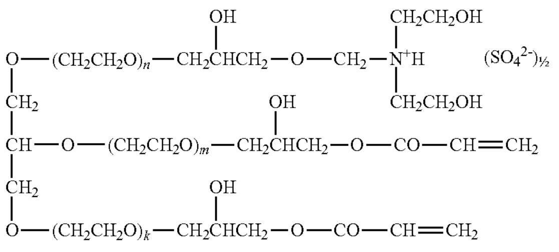
$n+m+k=15$
Cationic compound 9
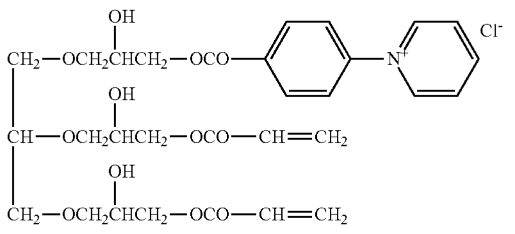

-continued

Cationic compound 10

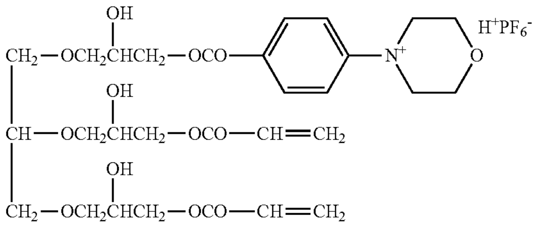

Cationic compound 11

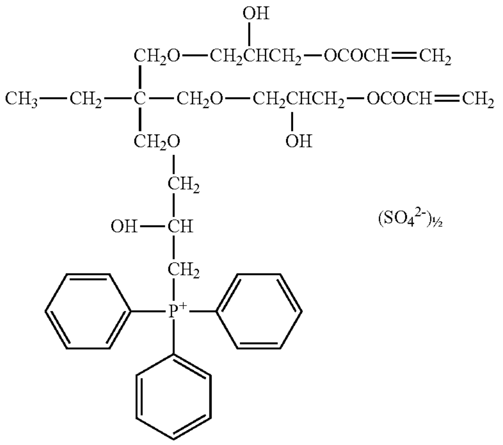

The polymerizable compound in the present invention is preferably a multifunctional monomer, and more preferably a bifunctional monomer to a hexafunctional monomer, from the viewpoints of increasing abrasion resistance. From the viewpoints of achieving both satisfactory solubility and satisfactory abrasion resistance, the polymerizable compound is preferably a bifunctional to tetrafunctional monomer.

In the ink composition of the present invention, one kind of the polymerizable compound may be contained or two or more kinds of the polymerizable compounds may be contained in combination.

The content of the polymerizable compound in the ink composition is preferably from 20% by mass to 800% by mass, and more preferably from 25% by mass to 600% by mass, with respect to the solid content of the total particles of the pigment and the self-dispersing polymer. When the content of the polymerizable compound is 20% by mass or more, the image strength is further improved and the abrasion resistance of the image is excellent. When the content of the polymerizable compound is 800% by mass or less, it is advantageous in terms of pile height.

Polymerization Initiator

The ink composition in the present invention may include at least one polymerization initiator which initiates polymerization of the polymerizable compound when being irradiated with an active energy ray, and a treatment liquid as described below may or may not contain the initiator. One kind of the polymerization initiator may be used singly, or two or more kinds of the polymerization initiators may be mixed and used. The polymerization initiator may be used in combination with a sensitizer.

The polymerization initiator (hereinafter, simply referred to as "initiator" in some cases) may be appropriately selected from a compound that is capable of initiating a polymerization reaction when irradiated with an active energy ray and used, and examples thereof include an initiator (for example, photopolymerization initiator) that generates an active species (such as a radical, an acid, or a base) when irradiated with radioactive rays, light, or electron beam.

Examples of the initiator include acetophenone, 2,2-diethoxy acetophenone, p-dimethylamino acetophen, p-dimethyl amino propiophenone, benzophenone, 2-chlorobenzophenone, p,p'-dichlorobenzophene, p,p'-bis diethyl amino benzophenone, Michler's ketone, benzyl, benzoin, benzoinmethyl ether, benzoinethyl ether, benzoin isopropylether, benzoin n-propylether, benzoinisobutyl ether, benzoin-n-butyl ether, benzyl dimethyl ketal, tetramethyl thiuram monosulfide, thioxanthone, 2-chlorothioxanthone, 2-methyl thioxanthone, azobisisobutyronitrile, benzoin peroxide, di-tert-butyl peroxide, 1-hydroxy cyclohexyl phenyl ketone, 1-[4-(2-hydroxy ethoxy)-phenyl]-2-hydroxy-2-methyl-1-propane-1-one, 2-hydroxy-2-methyl-1-phenyl-1-one, 1-(4-isopropylphenyl)-2-hydroxy-2-methyl propane-1-one, and methyl benzoyl formate. Furthermore, for example, aromatic diazonium salts, aromatic halonium salts, aromatic sulfonium salts, and metallocene compounds, such as triphenyl sulfonium hexafluorophosphate and diphenyl iodonium hexafluoro antimonate, can be included.

When the ink composition contains an initiator, the content of the initiator in the ink composition is preferably from 1% by mass to 40% by mass, and more preferably from 5% by mass to 30% by mass, with respect to the polymerizable compound. When the content of the initiator is 1% by mass or more, the abrasion resistance of an image is further improved, which is preferable in high-speed recording. A content of 40% by mass or less is preferable from the standpoint of jetting stability.

Examples of the sensitizer include an amine-containing compound (for example, aliphatic amines, amines including an aromatic group, and piperidine), a urea (for example, allyl-containing urea and o-tolythiourea), a sulfur-containing compound (for example, sodium diethyl dithiophosphate and a soluble salt of an aromatic sulfinic acid), a nitrile-containing compound (for example, N,N,-disubstituted p-amino benzonitrile), a phosphorous-containing compound (for example, tri-n-butyl phosphine, sodium diethyl dithio phosphate), a nitrogen-containing compound (for example, Michler's ketone, a N-nitrosohydroxylamine derivative, an oxazolidine compound, a tetrahydro 1,3 oxyazine compound, a condensate of a diamine with formaldehyde or acetoaldehyde), a chlorine-containing compound (for example, a carbon tetrachloride and hexachloroethane), a polymerized amine that is a reaction product of an epoxy resin and an amine, and triethanolamine triacrylate.

The sensitizer may be contained as long as the effects of the present invention are not impaired.

Water-Soluble Organic Solvent

The ink composition used in the present invention may include at least one kind of water-soluble organic solvent. By including the water-soluble organic solvent, for example, nozzle clogging that can be caused by dried ink on an ink jetting port is effectively inhibited (drying prevention agent), or the penetration of the ink composition into a recording medium (preferably a printing paper) is further promoted (penetration promotion agent). The viscosity of the ink composition may also be adjusted by the water-soluble organic solvent.

As the water-soluble organic solvent, a generally used water-soluble organic solvent may be used without any particular limitation. One kind of the water-soluble organic solvent may be used alone or two or more kinds of the water-soluble organic solvents in combination. Specific examples of the water-soluble organic solvent include:

alcohols (such as methanol, ethanol, propanol, isopropanol, butanol, isobutanol, sec-butanol, t-butanol, pentanol, hexanol, cyclohexanol, or benzyl alcohol);

polyhydric alcohols (such as ethylene glycol, diethylene glycol, triethylene glycol, polyethylene glycol, propylene glycol, dipropylene glycol, polypropylene glycol, butylene glycol, hexanediol, pentanediol, 2-methyl-1,3-propanediol, glycerin, hexanetriol, trimethylol propane, thiodiglycol, dithioglycol, or an acetylene glycol derivative);

glycol derivatives (such as ethylene glycolmonomethyl ether, ethylene glycolmonoethyl ether, ethylene glycolmonobutyl ether, diethylene glycolmonomethyl ether, diethylene glycolmonoethyl ether, diethylene glycolmonobutyl ether, propylene glycolmonomethyl ether, propylene glycolmonobutyl ether, dipropylene glycolmonomethyl ether, triethylene glycolmonomethyl ether, triethylene glycolmonobutyl ether, ethylene glycoldiacetate, ethylene glycolmonomethyl etheracetate, triethylene glycolmonomethyl ether, triethylene glycolmonoethyl ether, or ethylene glycolmonophenyl ether);

amines (such as ethanolamine, diethanolamine, triethanolamine, N-methyldiethanolamine, N-ethyldiethanolamine, morpholine, N-ethyl morpholine, ethylene diamine, diethylene triamine, triethylene tetramine, polyethylene imine, or tetramethylpropylene diamine), and other polar solvents (such as formamide, N,N-dimethylformamide, N,N-dimethylacetamide, dimethyl sulfoxide, sulfolane, 3-sulfolene, 2-pyrrolidone, N-methyl-2-pyrrolidone, N-vinyl-2-pyrrolidone, 2-oxazolidone, 1,3-dimethyl-2-imidazolidinone, acetonitrile, or acetone).

When a water-soluble organic solvent having a vapor pressure lower than that of water as the water-soluble organic solvent is used, drying of the nozzle in inkjet recording can be inhibited effectively. Specific examples of the water-soluble organic solvent having a vapor pressure lower than that of water include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, or trimethylol propane, lower alkyl ethers of polyhydric alcohols such as ethylene glycol monomethyl (or ethyl) ether, diethylene glycol monomethyl (or ethyl) ether, or triethylene glycol monomethyl (or butyl) ether, heterocycles such as 2-pyrrolidone, N-methyl-2-pyrrolidone, 1,3-dimethyl-2-imidazolidinone, or N-ethyl morpholine, sulfur-containing compounds such as sulfolane, dimethyl sulfoxide, or 3-sulfolene, polyfunctional compounds such as diacetone alcohol, or diethanol amine, and urea derivatives. Among them, polyhydric alcohols such as glycerin or diethylene glycol are preferable. The water-soluble organic solvent is preferably contained in the ink composition at 5% by mass to 50% by mass.

By using alcohols such as ethanol, isopropanol, butanol, di(tri)ethylene glycol monobutyl ether, or 1,2-hexanediol as a water-soluble organic solvent, penetration of an ink into a recording medium can be promoted more effectively. When the water-soluble organic solvent is contained at 5% by mass to 30% by mass in the ink composition, a sufficient effect is exerted. The amount of the water-soluble organic solvent to be added is preferably within a range such that bleeding of the printing and print-through do not occur. As a penetration promoting agent, sodium lauryl sulfate, sodium oleate, nonionic surfactants, or the like may suitably be used.

Water

The ink composition contains water, and the amount of water is not particularly limited. However, the content of water is preferably from 10% by mass to 99% by mass, more preferably from 30% by mass to 80% by mass, and still more preferably from 50% by mass to 70% by mass with respect to the ink composition.

Other Additives

The ink composition in the present invention may further include other additives other than the above components. Examples of the other additives include a known additive such as a polymerization inhibitor, an anti-drying agent (wetting agent), an anti-fading agent, an emulsification stabilizer, a penetration accelerating agent, an ultraviolet absorbing agent, a preservative, an antifungal agent, a pH adjuster, a surface tension adjuster, a defoamer, a viscosity modifier, a disperssant, a dispersion stabilizer, an anticorrosive agent, or a chelating agent. When these additives are added to the ink composition, these additives are usually directly added to the ink. When an oil dye is used as a dispersion, these additives are usually added to the dispersion after the preparation of a dye dispersion. However, the additives may be added to an oil phase or an aqueous phase during the preparation of the dye dispersion.

The ultraviolet absorbing agent can improve the storability of an image. Examples of the ultraviolet absorbing agent include benzotriazole-containing compounds such as those described in JP-A. No. 58-185677, JP-A. No. 61-190537, JP-A. No. 2-782, JP-A. No. 5-197075, and JP-A No. 9-34057; benzophenone-containing compounds such as those described in JP-A No. 46-2784, JP-A. No. 5-194483, and U.S. Pat. No. 3,214,463; cinnamic acid-containing compounds such as those described in Japanese Examined Patent Application Publication (JP-B) No. 48-30492, JP-B No. 56-21141, and JP-A. No. 10-88106; triazine-containing compounds such as those described in JP-A. No. 4-298503, JP-A. No. 8-53427, JP-A. No. 8-239368, JP-A. No. 10-182621, and PCT Japanese Translation Patent Publication (JP-T) No. 8-501291, compounds described in Research Disclosure No. 24239 and compounds as so-called fluorescent brighteners that emit fluorescent light upon absorption of UV rays such as stilbene-containing compounds and benzoxazole-containing compounds.

The anti-fading agent can improve the storability of an image. Examples of the anti-fading agent include an organic anti-fading agent and a metal complex anti-fading agent. Examples of the organic anti-fading agent include hydroquinones, alkoxy phenols, dialkoxy phenols, phenols, anilines, amines, indanes, chromanes, alkoxy anilines, and heterocyeles. Examples of the metal complex anti-fading agent include nickel complexes and zinc complexes. More specific examples thereof include compounds such as those described in patents cited in the section I or J in Chapter VII of Research Disclosure No. 17643, Research Disclosure No. 15162, in the left column on page 650 of Research Disclosure No. 18716, in page 527 of Research Disclosure No. 36544, in page 872 of Research Disclosure No. 307105, Research Disclosure No. 15162 and compounds within the scope of the formulae and examples of the representative compounds described in pages 127 to 137 of JP-A. No. 62-215272.

Examples of the antifungal agent include sodium dehydroacetate, sodium benzoate, sodium pyridinethione-1-oxide, p-hydroxy benzoate ethyl ester, 1,2-benzisothiazoline-3-one and a salt thereof. The content of the antifungal agent is preferably in a range of from 0.02% by mass to 1.00% by mass with respect to the ink composition.

As the pH adjuster, a neutralizing agent (organic base, inorganic alkali) may be used. The pH adjuster can improve the stability of the ink composition during storage. The pH adjuster is added to the extent that the pH of the ink composition is preferably from 6 to 10, and more preferably from 7 to 10.

Examples of the surface tension adjuster include nonionic surfactants, cationic surfactants, anionic surfactants, and betaine surfactants. The amount of the surface tension adjuster is preferably added in such an amount that the surface tension of the ink composition is preferably in a range of from 20 mN/m to 60 mN/m, more preferably in a range of from 20 mN/m to 45 mN/m, and still more preferably in a range of from 25 mN/m to 40 mN/m. When the surface tension adjuster is added in an amount in the above range, the ink composition is jetted in a favorable manner using an ink jet method.

Specific preferable examples of the surfactant include, as hydrocarbon surfactants, anionic surfactants such as fatty acid salt, alkyl sulfate ester salt, alkyl benzene sulfonate, alkyl naphthalene sulfonate, dialkyl sulfosuccinate, alkyl phosphate ester salt, naphthalene sulfonate formalin condensate, or polyoxyethylene alkyl sulfate ester salt; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester, or oxyethylene oxypropylene block copolymer. In addition, an acetylene-based polyoxyethylene oxide surfactant such as SURFYNOLS (trade name, manufactured by Air Products & Chemicals Inc.) and OLFINE (trade name, manufactured by Nissin Chemical Industry Co., Ltd.) are also preferably used. In addition, an amine oxide-type ampholytic surfactant such as N,N-dimethyl-N-alkyl amine oxide is also preferred.

Furthermore, surfactants described in pages 37 and 38 of JP-A No. 59-157636 and Research Disclosure No. 308119 (in 1989) may also be used.

By using, for example, fluorine (alkyl fluoride) surfactants or silicone surfactants described in JP-A No. 2003-322926, JP-A No. 2004-325707, and JP-A No. 2004-309806, abrasion resistance can be improved.

These surface tension adjusters may also be used as a defoamer, and chelating agents represented by fluorine compounds, silicone compounds, and EDTA may also be used.

Treatment Liquid

The treatment liquid includes at least an aggregating agent that is capable of aggregating the above-described components in the ink composition, but may further include other components if necessary. Since the treatment liquid is used with the ink composition, ink jet recording can be performed at a higher speed, and an image excellent in terms of the image-printing properties with a high density and high resolution (for example, reproducibility of thin lines and minute portions) can be obtained even when recording is performed at a high-speed.

The aggregating agent may be a compound that is capable of changing the pH of the ink composition, a polyvalent metal salt, or polyallylamines such as a polymer having quaternary or tertiary amine. In the present invention, from the viewpoints of the aggregating property of the ink composition, a compound that is capable of changing the pH of the ink composition is preferable, and a compound that is capable of decreasing the pH of the ink composition is more preferable.

Examples of the compound capable of decreasing the pH of the ink composition include an acidic substance.

Preferable examples of the acidic substance include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumalic acid, thiophene carboxylic acid, nicotine acid, and derivatives thereof, and salts thereof.

With respect to the acidic substance, one kind of the acidic substance may be used alone or two or more kinds of the acidic substances may be used in combination.

When the treatment liquid in the present invention includes an acidic substance, the pH (25° C.) of the treatment liquid is preferably 6 or less, and more preferably 4 or less. In particular, the pH (25° C.) is preferably in a range of from 1 to 4, and particularly preferably in a range of from 1 to 3. In such a case, the pH (25° C.) of the ink composition is preferably 7.5 or more (more preferably 8.0 or more).

Among the above, from the viewpoints of image density, resolution, and an ink jet recording at a higher speed, it is preferable that the pH (25° C.) of the ink composition be 8.0 or more and the pH (25° C.) of the treatment liquid is from 0.5 to 4.

Among the above, as the aggregating agent in the present invention, a highly water-soluble acidic substance is preferable. From the viewpoints of increasing aggregation property and immobilizing the entire ink, the aggregating agent in the present invention is preferably an organic acid, more preferably a di or higher-valent organic acid, and particularly preferably a divalent to trivalent organic acid. The di or higher-valent organic acid is preferably an organic acid having a first pKa of 3.5 or less, and more preferably an organic acid having a first pKa of 3.0 or less. Specific preferable examples thereof include phosphoric acid, oxalic acid, malonic acid, and citric acid.

Examples of the polyvalent metal salt include a salt of alkali earth metal which belongs to Group 2 of the periodic table (for example, magnesium and calcium), a salt of transition metal which belongs to Group 3 of the periodic table (for example, lanthanum), a salt of a metal from Group 13 of the periodic table (for example, aluminum), and a salt of lanthanides (for example, neodymium). Preferable examples of the salt of the above metals include carboxylic acid salt (such as formate, acetate, or benzoate), nitrate, chloride, and thiocyanate. Among them, a calcium salt or magnesium salt of carboxylic acid (formic acid, acetic acid, and benzoic acid), a calcium salt or magnesium salt of nitric acid, calcium chloride, magnesium chloride, and a calcium salt or magnesium salt of thiocyanic acid are preferable.

With respect to the aggregating agent, one kind of the aggregating agent may be used alone or two or more kinds of the aggregating agents may be mixed and used.

The content of the aggregating agent that is capable of aggregating the ink composition in the treatment liquid is preferably from 1% by mass to 50% by mass, more preferably from 3% by mass to 45% by mass, and still more preferably in a range of from 5% by mass to 40% by mass with respect to the treatment liquid.

The treatment liquid may further contain other additives as additional components as long as the effects of the present invention are not impaired. Examples of other additives include known additives such as the initiator described in a section of the ink composition, an anti-drying agent (wetting agent), an anti-fading agent, an emulsification stabilizer, a penetration accelerating agent, an ultraviolet absorbing agent, a preservative, an antifungal agent, a pH adjuster, a surface tension adjuster, a defoamer, a viscosity modifier, a dispersant, a dispersion stabilizer, an anticorrosive agent, and a chelating agent.

Inkjet Recording Device

Next, an example of an inkjet recording device that is preferable for performing the image forming method of the present invention is explained in detail with reference to FIG. 1. FIG. 1 is a schematic diagram showing an example of a configuration of an entire inkjet recording device.

As shown in FIG. 1, the inkjet recording device includes: a treatment liquid application unit 12 having a treatment liquid jetting head 12S that jets the treatment liquid; a treatment liquid drying zone 13 having a heating means (not shown) that dries the applied treatment liquid; an ink jetting unit 14 that jets various ink compositions; and an ink drying zone 15 at which the jetted ink composition is dried, in this order in the conveyance direction of the recording medium (the direction of the arrow shown in the FIGURE). An ultraviolet ray irradiation unit 16 having an ultraviolet ray irradiation lamp 16S, is provided downstream of the ink drying zone 15 in the conveyance direction of the recording medium.

The recording medium that has been supplied to the inkjet recording device is conveyed by conveyance rollers from a feed unit for feeding a recording medium from a case charged with the recording medium to the treatment liquid application unit 12, then to the treatment liquid drying zone 13, then to the ink jetting unit 14, then to the ink drying zone 15, and then to the ultraviolet ray irradiation unit 16, and then accumulated in an accumulation unit. The conveyance of the recording medium may be conducted by the method using conveyance rollers, a drum conveyance method using a drum-shaped member, a belt conveyance method, or a stage conveyance method using a stage.

Among the plural conveyance rollers provided in the inkjet recording device, at least one roller may be a drive roller to which a force generated by a motor (not shown) is transmitted. When the drive roller is rotated by the motor at a constant rate, the recording medium is conveyed in a predetermined direction at a predetermined conveyance amount.

The treatment liquid application unit 12 has the treatment liquid jetting head 12S, which is connected to a storage tank in which the treatment liquid is stored. The treatment liquid jetting head 12S jets the treatment liquid from jetting nozzles placed to face a recording surface of the recording medium so that droplets of the treatment liquid can be applied onto the recording medium. The method used in the treatment liquid application unit 12 is not limited to a method of jetting from a head in the form of a nozzle, and may be a coating method using a coating roller. According to the coating method, the treatment liquid may be readily applied to almost a whole of one surface of the recording medium, including an image portion on which ink droplets are to be spotted by the ink jetting unit 14 provided at the downstream side. In order to make the thickness of the treatment liquid applied onto the recording medium uniform, an air-knife may be used, a method of providing a member having an acute angle to give a gap between the member and the recording medium that corresponds to a predetermined amount of the treatment liquid, or the like may be provided.

The treatment liquid drying zone 13 is positioned downstream of the treatment liquid application unit 12 in the conveyance direction of the recording medium. The treatment liquid drying zone 13 may include: a known heating means such as a heater or the like; an air blowing means using air blowing such as a dryer or the like; or a combination thereof. Examples of the heating means include a method of providing a heat-generating member such as a heater at a side of the recording medium opposite to the surface on which the treatment liquid is applied (for example, when the recording medium is conveyed automatically, the heat-generating member may be positioned, below the conveyance system that conveys the recording medium placed thereon); and a method of blowing warm or hot air onto the surface of the recording medium on which the treatment liquid is applied; a heating method of using an infrared ray heater. These methods may be used in combination.

Since the surface temperature of the recording medium varies depending on the type of the recording medium (materials, thickness, and the like) and an environmental temperature, it is preferable to dry the treatment liquid while regulating the surface temperature by a heating control unit using a system including a measurement unit that measures the surface temperature of the recording medium and a regulation mechanism that provides the heating control unit feedback on the surface temperature of the recording medium measured by the measurement unit. The measurement unit for measuring the surface temperature of the recording medium is preferably a contact-type or non-contact type thermometer.

The solvent may be removed using a solvent-removing roller or the like. In an alternative embodiment, a method in which excess solvent is removed from the recording medium by an air knife may also be used.

The ink jetting unit 14 is positioned downstream of the treatment liquid drying zone 13 with respect to the conveyance direction of the recording medium. The ink jetting unit 14 includes recording heads (ink jetting heads) 30K, 30C, 30M, and 30Y, which are connected to respective ink reservoirs that store inks of black (K), cyan (C), magenta (M), and yellow (Y), respectively. Each ink reservoir (not shown) stores an ink composition containing a pigment of a corresponding color, resin particles, a water-soluble organic solvent, and water, and supplies each of the inks to the corresponding ink jetting heads 30K, 30C, 30M, and 30Y, if necessary, when image recording is performed. As shown in FIG. 1, recording heads 30A and 30B for jetting the inks of specific colors may be further provided, which are positioned downstream of the ink jetting heads 30K, 30C, 30M, and 30Y with respect to the conveyance direction of the recording medium, so that the inkjet recording heads 30A and 30B jet the inks having specific colors, if necessary.

Each of the ink jetting heads 30K, 30C, 30M, and 30Y jets ink corresponding to an image to be formed from the jetting nozzles that are positioned so as to face the recording surface of the recording medium. In this way, inks of the respective colors are applied to the recording surface of the recording medium and a color image is recorded.

The treatment liquid jetting head 12S and the ink jetting heads 30K, 30C, 30M, 30Y, 30A, and 30B are each in the form of full-line head in which a number of jetting ports (nozzles) are aligned along the maximum recording width of the image to be recorded on the recording medium (maximum recording width). In this form, image recording on a recording medium is carried out at higher speed compared to serial-type recording in which recording is carried out using a short-length shuttle head that reciprocates in the width direction of the recording medium (a direction on a main face of the recording medium that is orthogonal to the conveyance direction of the recording medium) in a scanning manner. In the present invention, either of the above serial-type recording method or a recording method capable of recording at relatively high speed such as a single-path system in which an image is formed in one scanning-movement by jetting using a line head while moving the recording medium relative to the line head in the main scanning direction, may be employed. In the image recording method of the present invention, a high-quality image having high reproducibility may be obtained in the single-path system.

Herein, the treatment liquid jetting head 12S and the ink jetting heads 30K, 30C, 30M, 30Y, 30A, and 30B have the same structure.

The application amount of the treatment liquid and the application amount of the ink composition are preferably regulated, if necessary. For example, the application amount of the treatment liquid may be changed according to the type of the recording medium, in order to, for example, adjust the properties such as viscoelasticity of the aggregates formed upon mixing of the treatment liquid and the ink composition, and the like.

The ink drying zone 15 is positioned downstream of the ink jetting unit 14 in the conveyance direction of the recording medium. The ink drying zone 15 may have a structure similar to that of the treatment liquid drying zone 13.

The ultraviolet ray irradiation unit 16 is disposed further downstream of the ink drying zone 15 in the conveyance direction of the recording medium, and emits an ultraviolet ray from the ultraviolet ray irradiation lamp 16S provided in the ultraviolet ray irradiation unit 16, thereby polymerizing and curing the monomer components contained in an image after drying of the image. The ultraviolet ray irradiation lamp 16S is a lamp which is disposed to face the recording surface of the recording medium, and with which the entire recording surface is irradiated to cure the entire image. The ultraviolet ray irradiation unit 16 is not limited to the ultraviolet ray irradiation lamp 16S, and it is also possible to employ a halogen lamp, a high-pressure mercury lamp, a laser, an LED, an electron-beam irradiation device, or the like.

The ultraviolet ray irradiation unit 16 may be provided either before or after the ink drying zone 15, or the ultraviolet ray irradiation unit 16 may be provided both before and after the ink drying zone 15.

The inkjet recording device may further include a heating means on a conveyance path from the feed unit to the accumulation unit, in order to conduct a heat treatment on the recording medium. For example, by providing a heating means at a desired position such as upstream of the treatment liquid drying zone 13, between the ink jetting unit 14 and the ink drying zone 15, or the like, the temperature of the recording medium can be increased to a desired temperature, at which drying and fixing is performed effectively.

EXAMPLES

Hereinafter, the present invention is described in detail with reference to Examples. However, the present invention is not limited to these Examples. Moreover, the term "part(s)" and "%" are based on mass, respectively, unless otherwise noted.

Preparation of Ink Composition

Preparation of Cyan Ink C-1

Preparation of Solution of Polymer Dispersant 1

6 parts of styrene, 11 parts of stearyl methacrylate, 4 parts of styrene macromer AS-6 (trade name, manufactured by Toagosei Co., Ltd.), 5 parts of BLEMMER PP-500 (trade name, manufactured by NOF Corporation), 5 parts of methacrylic acid, 0.05 parts of 2-mercaptoethanol, and 24 parts of methyl ethyl ketone were added into a reaction vessel to prepare a mixed solution 1.

14 parts of styrene, 24 parts of stearyl methacrylate, 9 parts of styrene macromer AS-6 (trade name, manufactured by Toagosei Co., Ltd.), 9 parts of BLEMMER PP-500 (trade name, manufactured by NOF Corporation), 10 parts of methacrylic acid, 0.13 parts of 2-mercaptoethanol, 56 parts of methyl ethyl ketone, and 1.2 parts of 2,2'-azobis(2,4-dimethylvaleronitrile) were added into a dropping funnel to prepare a mixed solution 2.

Subsequently, in a nitrogen atmosphere, the mixed solution 1 in the reaction vessel was heated to 75° C. while stirring, and the mixed solution 2 in the dropping funnel was gradually dropped into the reaction vessel over one hour. Two hours after the completion of the dropping, a solution in which 1.2 parts of 2,2'-azobis(2,4-dimethylvaleronitrile) was dissolved in 12 parts of methyl ethyl ketone was dropped into the reaction vessel over 3 hours. The mixed solution was further aged at 75° C. for 2 hours and then at 80° C. for 2 hours. As a result, a solution of a polymer dispersant 1 was obtained.

A part of the obtained solution of the polymer dispersant 1 was isolated by removing the solvent, and the obtained solid content was diluted with tetrahydrofuran to 0.1% by mass. The diluted solid content of the solution of the polymer dispersant 1 was subjected to high-speed GPC (gel permeation chromatography) HLC-8220 GPC (trade name) with three columns of TSKgeL Super HZM-H, TSKgeL Super HZ4000, and TSKgeL Super HZ2000 (trade names, all manufactured by Tosoh Corporation) connected in series, and the weight average molecular weight was measured. As a result, the weight average molecular weight was 25,000 calculated in terms of polystyrene. Further, the acid value was 99 mgKOH/g.

Preparation of Cyan Dispersion Liquid C1

Next, 5.0 g in terms of the solid content of the solution of the polymer dispersant 1 obtained above, 10.0 g of a cyan pigment, PIGMENT BLUE 15:3 (trade name, manufactured by Dainichiseika Color & Chemicals Mfg. Co., Ltd.), 40.0 g of methyl ethyl ketone, 8.0 g of 1 mol/L (liter; this shall apply hereinafter) sodium hydroxide, and 82.0 g of ion exchange water were put in a vessel together with 300 g of 0.1 mm zirconia beads, and were dispersed for 6 hours at 1,000 rpm with a disperser READY MILL (trade name, manufactured by Aimex Co., Ltd.). The resulting dispersion liquid was condensed under reduced pressure using an evaporator until methyl ethyl ketone was sufficiently removed by distillation, and the dispersion liquid was further condensed until the concentration of pigment reached 10%. As a result, a cyan pigment dispersion liquid C1 in which the water-dispersible pigment was dispersed was obtained.

The volume average particle diameter (of the secondary particles) of the resulting cyan dispersion liquid C1 by measuring by a dynamic light scattering method using a MICROTRAC particle size distribution meter (Version 10.1.2-211 BH (trade name), manufactured by Nikkiso Co., Ltd.) was 78 nm.

Cyan dispersion liquids C2 to C5 were prepared in the same manner as in the preparation of the cyan dispersion liquid C1 except that the dispersion time was adjusted such that each of the volume average particle diameters was the value described in Table 1.

| Cyan dispersion liquid | Volume average particle diameter |
|---|---|
| C2 | 100 nm |
| C3 | 125 nm |
| C4 | 66 nm |
| C5 | 140 nm |

Synthesis of Self-Dispersing Polymer Particles 1

360.0 g of methyl ethyl ketone was introduced in a 2 L three-necked flask equipped with a stirrer, a thermometer, a reflux condenser, and a nitrogen gas introduction tube, and was heated to 75° C. Thereafter, while the temperature inside the flask was maintained at 75° C., a mixture solution of 180.0 g of phenoxyethyl acrylate, 162.0 g of methyl methacrylate, 18.0 g of acrylic acid, 72 g of methyl ethyl ketone, and 1.44 g of "V-601" (trade name, manufactured by Wako Pure Chemical Industries Ltd.) was added dropwise into the flask at a constant rate such that the dropwise addition was completed in 2 hours. After the dropwise addition was completed, a solution of 0.72 g of "V-601 (trade name)" and 36.0 g of methyl ethyl ketone was added into the flask, stirred at 75° C. for 2 hours, and a solution of 0.72 g of V-601 and 36.0 g of isopropanol was further added, and the contents of the flask were stirred at 75° C. for 2 hours. Then, the temperature inside the flask was increased to 85° C., and stirring was continued for another 2 hours. As a result, a resin solution of a copolymer of phenoxyethyl acrylate/methyl methacrylate/acrylic acid (=50/45/5 [mass ratio]) was obtained.

The weight average molecular weight (Mw) of the obtained copolymer measured in the same manner as described above was 64,000 (calculated by gel permeation chromatography (GPC) in terms of polystyrene). The acid value of the copolymer was found to be 38.9 mgKOH/g.

Then, 668.3 g of the obtained resin solution was weighed, and 388.3 g of isopropanol and 145.7 ml of a 1 mol/L aqueous NaOH solution were added thereto, and then the temperature inside the reaction vessel was raised to 80° C. Thereafter, 720.1 g of distilled water was added dropwise into the reaction vessel at a rate of 20 ml/min so as to form a water dispersion. The contents of the reaction vessel were allowed to stand, under atmospheric pressure, at a temperature inside the reaction vessel of 80° C. for 2 hours, and then 85° C. for 2 hours, and then 90° C. for 2 hours. Subsequently, the inside of the reaction vessel was depressurized, and a total amount of 913.7 g of the isopropanol, the methyl ethyl ketone, and the distilled water were removed. As a result, a water dispersion of self-dispersing polymer particles 1 having a solid concentration of 28.0% by mass was obtained.

After the cyan dispersion liquid C1 was prepared as described above, the cyan dispersion liquid C1 was mixed with the water dispersion of the self-dispersing polymer particles 1, an organic solvent, a surfactant, and ion exchange water such that the mixture had the following composition, the mixture was filtered through a 5 μm filter so as to remove coarse particles, thereby obtaining a cyan ink C1.

Composition of Cyan Ink C1

| | |
|---|---|
| Cyan pigment (PIGMENT BLUE 15:3, trade name, manufactured by Dainich Color and Chemicals Mfg. Co., Ltd.) | 3% |
| Polymer dispersant 1 | 1.35% |
| Water dispersion of self-dispersing polymer particles 1 | 2% |
| Polymerizable compound (nonionic compound 6) | 15% |

-continued

| | |
|---|---|
| 1,2-Hexanediol | 3% |
| OLFINE E1010 (trade name, manufactured by Nissin Chemical Industry Co., Ltd.) | 1% |
| IRGACURE 2959 (trade name, manufactured by Ciba Specialty Chemicals) | 3% |
| Ion exchange water | remaining amount |

Preparation of Cyan Inks C2 to C5

Each of cyan inks C2 to C5 was prepared in the same manner as in the preparation of the cyan ink C1 described above except that each of the cyan dispersion liquids C2 to C5 was used instead of the cyan dispersion liquid C1.

Preparation of Treatment Liquid

Preparation of Treatment Liquid 1

Components having the following composition were mixed to form a treatment liquid 1. The viscosity of the treatment liquid 1 was 2.5 mPa·s, the surface tension was 40 mN/m, and the pH (25±1° C.) was 1.0.

The viscosity was measured under the condition of 20° C. using a VISCOMETER TV-22 (trade name, manufactured by Toki Sankyo Co., Ltd.), and the surface tension was measured under the condition of 25° C. using an Automatic Surface Tensiometer CBVP-Z (trade name, manufactured by Kyowa Interface Science Co., LTD.).

Composition of Treatment Liquid 1

| | |
|---|---|
| Malonic acid (manufactured by Wako Pure Chemical Industries Ltd.) | 25% |
| Diethyleneglycol monomethyl ether (manufactured by Wako Pure Chemical Industries Ltd.) | 20% |
| EMULGEN P109 (trade name, manufactured by Kao Corporation, nonionic surfactant) | 1% |
| Ion exchange water | 54% |

Preparation of Treatment Liquid 2

Components of the following composition were mixed to form a treatment liquid 2. The viscosity, the surface tension, and the pH (25±1° C.), as measured in the above-described manner, of the treatment liquid 2 were 2.5 mPa·s, 40 mN/m, and 1.0, respectively.

Composition of Treatment Liquid 2

| | |
|---|---|
| Malonic acid (manufactured by Wako Pure Chemical Industries Ltd.) | 25% |
| Diethyleneglycol monomethyl ether (manufactured by Wako Pure Chemical Industries Ltd.) | 20% |
| EMULGEN P109 (trade name, manufactured by Kao Corporation, nonionic surfactant) | 1% |
| IRGACURE 2959 (trade name, manufactured by Ciba Specialty Chemicals; photopolymerization initiator) | 1% |
| Ion exchange water | 53% |

Preparation of Treatment Liquid 3

Components of the following composition were mixed to form a treatment liquid 3. The viscosity, the surface tension, and the pH (25±1° C.), as measured in the above-described manner, of the treatment liquid 3 were 2.7 mPa·s, 45 mN/m, and 6.8, respectively.

Composition of Treatment Liquid 3

| | |
|---|---|
| Magnesium nitrate•hexahydrate (polyvalent metal salt) | 25% |

-continued

| | |
|---|---|
| Isobutylbenzoin ether | 10% |
| Triethylene glycolmonobutyl ether | 10% |
| Glycerin | 10% |
| Ion exchange water | remaining amount (added such that the total amount as 100%) |

Preparation of Treatment Liquid 4

Preparation of Cationic Polymer Aqueous Solution

Guanidine acetate (65 g) and 1,6-hexamethylene diamine (66.7 g) were introduced and mixed in a 250 ml round-bottom flask, and then the mixture was heated to 120° C. while stirring under an atmosphere of nitrogen gas, followed by maintaining stirring for 4 hours. Then, the temperature was raised to 150° C., and the reaction mixture was stirred at this temperature for another 20 hours. The reaction mixture was naturally cooled to room temperature and then mixed with the same volume of distilled water, followed by heating to 80° C. Further, this temperature was maintained until a homogeneous solution was obtained. The solution was cooled down, and the pH was adjusted to pH 7 using acetic acid. Further, the solution was diluted using ion exchange water such that the solution has a solid content of 25%.

Thus-obtained cationic polymer aqueous solution had an average molecular weight (Mw) of 1120, as measured by gel permeation chromatography.

Components of the following composition were mixed to form a treatment liquid 4. The viscosity, the surface tension, and the pH (25±1° C.), as measured in the above-described manner, of the treatment liquid 4 were 3.5 mPa·s, 40 mN/m, and 6.7, respectively.

Composition of Treatment Liquid 4

| | |
|---|---|
| Cationic polymer aquiesou solution prepared above | 20% |
| 2-Pyrrolidone | 9% |
| Thiodiethylene glycol | 9% |
| Cyclohexanol | 2% |
| Ion exchange water | remaining amount (added such that the total amount was 100%) |

Image Recording and Evaluation

The ink and the treatment liquid 1 obtained above were used in the combinations described in Table 2 below, and an image was recorded as described below. Further, the jettability and the adhesiveness were evaluated according to the following method. The evaluation results are shown in Table 2 below.

Image Recording

First, as shown in FIG. 1, an inkjet device was prepared which has a treatment liquid applying unit 12 equipped with a treatment liquid jetting head 12S that jets a treatment liquid, a treatment liquid drying zone 13 that dries the applied treatment liquid, an ink jetting unit 14 that jets various ink compositions, an ink drying zone 15 that dries the jetted ink compositions, and an ultraviolet ray irradiation unit 16 equipped with a UV irradiation lamp 16S capable of irradiation ultraviolet rays (UV) are provided in the conveyance direction of a recording medium (the direction of the arrow shown in the FIGURE).

Although not shown in the FIGURE, a treatment liquid drying zone 13 has an air blower that performs drying by supplying dry air at a recording surface side of the recording medium, and has an infrared ray heater at a non-recording surface of the recording medium. The treatment liquid drying zone 13 is configured such that at least 70% by mass of the water contained in the treatment liquid can be evaporated (dried) off within 900 msec after the application of the treatment liquid is started at the treatment liquid application unit by regulating the temperature and air volume. Further, in the ink jetting unit 14, a black-ink jetting head 30K, a cyan-ink jetting head 30C, a magenta-ink jetting head 30M, and a yellow-ink jetting head 30Y are disposed in this order in the conveyance direction (the direction of the arrow). Each of the heads is a 1200 dpi/10 inch-wide full-line head (a driving frequency: 25 kHz and a recording medium conveyance velocity of 500 mm/sec). The respective heads jet inks of respective colors in a single-pass manner while moving in the main scanning direction relative to the recording medium, thereby recording an image.

The treatment liquid 1 and the ink compositions C1 to C5 each prepared above were charged into each of storage tanks (not shown in the FIGURE) respectively connected to the treatment jetting head 12S and the cyan ink jetting head 30C of the inkjet device shown in FIG. 1. A solid image and a 1200 dpi line image were recorded on a recording medium. The amount of the treatment liquid applied to the recording medium was set to be 5 $ml/m^2$. As the recording medium, "OK TOPKOTE (trade name)" (having a basis weight of 104.7 $g/m^2$) manufactured by Oji Paper Co., Ltd. was used.

During the image recording, the treatment liquid and the cyan ink were each jetted at a resolution of 1200 dpi×600 dpi, an ink amount per droplet of 3.5 pl, and a maximum application amount of ink of 11 $ml/m^2$. The line image was recorded by jetting so as to form a line having a width of 1 dot at 1200 dpi in a single-pass manner in the main scanning direction. Regarding the solid image, a solid image was formed by jetting the ink onto the entire one surface of a sample which was prepared by cutting the recording medium into an A5 size to obtain the solid image.

When the image was recorded, the treatment liquid was first jetted from the treatment liquid jetting head 12S onto the recording medium in a single-pass manner (a jetting amount of 5 $ml/m^2$), and then the treatment liquid was dried in the treatment liquid drying zone 13 such that the recording medium passed the treatment liquid drying zone within 900 msec after the initiation of the jetting of the treatment liquid. In treatment liquid drying zone 13, while the jetted treatment liquid was heated with an infrared ray heater from a side of the recording medium that was opposite to the surface on which the treatment liquid was jetted (rear face) such that the surface temperature of the jetted treatment liquid was maintained at from 40° C. to 45° C., the recording surface was dried using an air blower by blowing hot air of 120° C. at 5 m/sec for 5 seconds. Subsequently, the cyan ink was jetted from the cyan ink jetting head 30C in a single pass manner to record an image. Then, in a manner similar to the above, drying of the ink was performed in ink drying zone 15 using an air blower by blowing hot air having a temperature of 120° C. in a different air amount such that the predetermined drying amount was obtained while heating the jetted ink with an infrared ray heater from the side of the recording medium that was opposite to the surface on which the ink was jetted (rear face). Further, the method for measuring the drying amount is described below. After the drying of the image, the image was cured by irradiation with UV rays (a metal halide lamp manufactured by Eye Graphics Co., Ltd., a maximum irradiation wavelength of 365 nm) in the UV irradiation unit 16 so as to have an accumulated irradiation amount of 3 $J/cm^2$. The results are shown in Table 2.

Image Evaluation

1. Evaluation of Jettability

With the use of OK TOPKOTE (trade name) having an A5 size as a recording medium, a 10 bit line having a width of 1 dot was output onto the recording medium with a shift per nozzle in the manner as described above, whereby an image was formed. The formed image was visually observed and evaluated according to the following evaluation criteria.

Evaluation Criteria

1: The number of the non jetting nozzles and the number of the nozzles that do not jet in parallel to the conveyance direction were less than 3% with respect to the total number of nozzles.

2: The number of the non jetting nozzles and the number of the nozzles that do not jet in parallel to the conveyance direction were from 3% to less than 5% with respect to the total number of nozzles.

3: The number of the non jetting nozzles and the number of the nozzles that are not parallel to the conveyance direction were 5% or more with respect to the total number of nozzles.

15, and without irradiation of UV rays in the UV irradiation unit 16. For the obtained image, a moisture amount $W_0$ contained in the image was measured by a Karl Fischer method using a Karl Fischer moisture meter MKA-520 (trade name, manufactured by Kyoto Electronics Manufacturing Co., Ltd.).

Further, the image was formed in the same manner as described above except that heating/air blowing was performed under a predetermined drying condition in the ink drying zone 15, and except for irradiation with UV rays was not performed. A moisture amount $W_1$ contained by the obtained image was measured by a Karl Fischer method. The drying amount (%) was calculated by the following formula.

$$(W_0-W_1)/W_0 \qquad \text{(Formula)}$$

| | | Ink C1 | Ink C2 | Ink C3 | Ink C4 | Ink C5 | Ink C2 |
|---|---|---|---|---|---|---|---|
| Volume average particle diameter | | 78 nm | 100 nm | 125 nm | 66 nm | 140 nm | 100 nm |
| Maximum application amount | | 11 ml/m$^2$ | 11 ml/m$^2$ | 11 ml/m$^2$ | 11 ml/m$^2$ | 11 ml/m$^2$ | 16 ml/m$^2$ |
| Adhesiveness | Drying amount 50% | 4 | 4 | 4 | 4 | * | 4 |
| | Drying amount 60% | 2 | 1 | 1 | 4 | * | 4 |
| | Drying amount 70% | 1 | 1 | 2 | 3 | * | 4 |
| | Drying amount 80% | 1 | 1 | 2 | 3 | * | 4 |
| | Drying amount 90% | 3 | 3 | 3 | 4 | * | 4 |
| | Drying amount 100% | 4 | 3 | 3 | 4 | * | 4 |
| Jettability | | 1 | 1 | 2 | 1 | 3 | 1 |

* Can not be evaluated due to significant jetting unevenness

2. Evaluation of Adhesiveness

With the use of OK TOPKOTE (trade name) having an A5 size as a recording medium, a solid image was output at a maximum application amount of the ink of 11 ml/m$^2$ in the manner as described above. The solid image was left to stand for 1 hour under an environment of 50% RH, and then a CELLOPHANE TAPE (trade name, manufactured by Nichiban Co., Ltd.) was adhered to the image and then peeled off therefrom. The damage state of the image was evaluated according to the following evaluation criteria.

Evaluation Criteria

1: The image was not transferred onto the tape.

2: The image surface was partly transferred onto the tape, but most of the image was not transferred and remained on the image surface.

3: The image surface was partly transferred onto the tape, and the recording medium surface without the image was partially exposed.

4: The image was entirely transferred onto the tape and the recording medium surface was exposed.

Measurement of Drying Amount

In the above-described image forming method, the treatment liquid (application amount of 2 ml/m$^2$) was applied onto the recording medium, and then solid images were output at maximum application amounts of ink of 11 ml/m$^2$ and 16 ml/m$^2$, respectively, as shown in Table 2. Further, output was performed without heating/blowing air in the ink drying zone 15, and without irradiation of UV rays in the UV irradiation unit 16.

As shown in Table 2 above, within a range in which the volume average particle diameter of the pigment was from 70 nm to 130 nm and the drying amount was 60% to 80%, an image having good ink jettability and good tape adhesiveness was obtained. When the volume average particle diameter of the pigment and the drying amount was out of this range, compatibility between the tape adhesiveness and the jettability could not be achieved.

In addition, using "XEROX 4024 (trade name)" manufactured by Fuji Xerox Co., Ltd. as a recording medium instead of "OK TOPKOTE (trade name)" manufactured by Oji Paper Co., Ltd., evaluation described above was performed. As a result, both the tape adhesiveness and jettability were good when a volume average particle diameter of the pigment was from 70 nm to 130 nm and a drying amount was in the range of from 60% to 80%.

Further, also each evaluation was performed using the treatment liquids 2 to 4 instead of the treatment liquid 1. Both the tape adhesiveness and jettability were good when a volume average particle diameter of the pigment, as measured in the above-described manner, was 70 nm to 130 nm and a drying amount was in the range of from 60% to 80%.

According to the present invention, an image forming method in which an image having excellent adhesiveness to a recording medium can be formed is provided.

Embodiments of the present invention include, but are not limited to, the following.

<1> An Image Forming Method Comprising:

applying an ink composition including a pigment having a volume average particle diameter of 70 nm to 130 nm, a polymerizable compound, and water, onto a recording medium using an inkjet under a condition that a maximum application amount of the ink composition is 15 ml/$m^2$ or less;

applying, onto the recording medium, a treatment liquid including an aggregating agent that is capable of aggregating components in the ink composition;

removing at least a part of the water contained in the ink composition that has been applied onto the recording medium in the applying of the ink composition, under a drying condition such that 60% by mass to 80% by mass of the water contained in the ink composition applied at the maximum application amount is removed, thereby performing drying; and irradiating, with an active energy ray, the ink composition from which water has been removed, thereby performing polymerization.

<2> The image forming method according to <1>, wherein the pigment comprises a water-dispersible pigment in which at least a part of a surface thereof is coated with a polymer dispersant.

<3> The image forming method according to <2>, wherein the polymer dispersant has a carboxyl group.

<4> The image forming method according to any one of <1> to <3>, wherein the aggregating agent is at least one selected from an organic acid, a polyvalent metal salt, or a cationic polymer.

<5> The image forming method according to any one of <1> to <4>, wherein at least one of the ink composition or the treatment liquid further comprises a polymerization initiator.

<6> The image forming method according to any one of <1> to <5>, wherein the ink composition further comprises resin particles.

<7> The image forming method according to any one of <1> to <6>, wherein the recording medium is a coated paper that includes a base paper and a coating layer containing an inorganic pigment and provided on the base paper.

All publications, patent applications, and technical standards mentioned in this specification are herein incorporated by reference to the same extent as if each individual publication, patent application, or technical standard was specifically and individually indicated to be incorporated by reference.

What is claimed is:

1. An image forming method comprising:

applying an ink composition including a pigment having a volume average particle diameter of 70 nm to 130 nm, a polymerizable compound, and water, onto a recording medium using an inkjet under a condition that a maximum application amount of the ink composition is 15 ml/$m^2$ or less;

applying, onto the recording medium, a treatment liquid including an aggregating agent that is capable of aggregating components in the ink composition;

removing at least a part of the water contained in the ink composition that has been applied onto the recording medium in the applying of the ink composition, under a drying condition such that 60% by mass to 80% by mass of the water contained in the ink composition applied at the maximum application amount is removed, thereby performing drying; and irradiating, with an active energy ray, the ink composition from which water has been removed, thereby performing polymerization.

2. The image forming method according to claim 1, wherein the pigment comprises a water-dispersible pigment in which at least a part of a surface thereof is coated with a polymer dispersant.

3. The image forming method according to claim 2, wherein the polymer dispersant has a carboxyl group.

4. The image forming method according to claim 1, wherein the aggregating agent is at least one selected from an organic acid, a polyvalent metal salt, or a cationic polymer.

5. The image forming method according to claim 1, wherein at least one of the ink composition or the treatment liquid further comprises a polymerization initiator.

6. The image forming method according to claim 1, wherein the ink composition further comprises resin particles.

7. The image forming method according to claim 1, wherein the recording medium is a coated paper that includes base paper and a coating layer containing an inorganic pigment and provided on the base paper.

* * * * *